United States Patent
Lin et al.

(10) Patent No.: US 9,354,425 B2
(45) Date of Patent: May 31, 2016

(54) WIDE-ANGLE IMAGE CAPTURING LENS ASSEMBLY, IMAGE CAPTURING DEVICE AND VEHICLE DEVICE

(71) Applicant: Largan Precision Co., Ltd., Taichung (TW)

(72) Inventors: Cheng-Chen Lin, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 174 days.

(21) Appl. No.: 14/267,988

(22) Filed: May 2, 2014

(65) Prior Publication Data

US 2015/0253542 A1     Sep. 10, 2015

(30) Foreign Application Priority Data

Mar. 10, 2014  (TW) .............................. 103108193 A

(51) Int. Cl.
| | |
|---|---|
| H04N 7/18 | (2006.01) |
| G02B 13/00 | (2006.01) |
| G02B 9/34 | (2006.01) |
| G02B 13/06 | (2006.01) |

(52) U.S. Cl.
CPC ................ *G02B 13/004* (2013.01); *G02B 9/34* (2013.01); *G02B 13/06* (2013.01)

(58) Field of Classification Search
CPC ......... G02B 13/004; G02B 13/06; G02B 9/34
USPC .................................... 348/148, 335; 359/715
See application file for complete search history.

(56) References Cited

U.S. PATENT DOCUMENTS

| | | |
|---|---|---|
| 2013/0208354 A1 | 8/2013 | Tsai et al. |
| 2014/0226222 A1 | 8/2014 | Hsieh et al. |

FOREIGN PATENT DOCUMENTS

| | | |
|---|---|---|
| CN | 202093231 U | 12/2011 |
| CN | 102213821 B | 4/2013 |

(Continued)

OTHER PUBLICATIONS

English translation of abstract of CN 202093231 (published Dec. 28, 2011).

(Continued)

*Primary Examiner* — Jamie Atala
*Assistant Examiner* — Nguyen Truong
(74) *Attorney, Agent, or Firm* — McClure, Qualey & Rodack, LLP

(57) ABSTRACT

A wide-angle image capturing lens assembly includes, in order from an object side to an image side, a first lens element, a second lens element, a third lens element and a fourth lens element. The first lens element with negative refractive power has an image-side surface being concave in a paraxial region thereof. The second lens element with refractive power has an image-side surface being convex in a paraxial region thereof. The third lens element has positive refractive power. The fourth lens element with refractive power has an object-side surface being concave in a paraxial region thereof and an image-side surface being convex in a paraxial region thereof. The object-side surface and the image-side surface of the fourth lens element are aspheric. At least one of the object-side surface and the image-side surface of the fourth lens element has at least one inflection point in an off-axis region thereof.

20 Claims, 18 Drawing Sheets

(56) References Cited

FOREIGN PATENT DOCUMENTS

| | | |
|---|---|---|
| JP | 2007279548 A | 10/2007 |
| TW | 201326886 A1 | 7/2013 |

OTHER PUBLICATIONS

English translation of abstract of CN 102213821 (published Apr. 10, 2013).

English translation of abstract of TW 201326886 (published Jul. 1, 2013).

WIDE-ANGLE IMAGE CAPTURING LENS ASSEMBLY, IMAGE CAPTURING DEVICE AND VEHICLE DEVICE

RELATED APPLICATIONS

This application claims priority to Taiwan Application Serial Number 103108193, filed Mar. 10, 2014, which is herein incorporated by reference.

BACKGROUND

1. Technical Field

The present disclosure relates to a wide-angle image capturing lens assembly. More particularly, the present disclosure relates to a compact wide-angle image capturing lens assembly for vehicle devices.

2. Description of Related Art

In recent years, driving safety has been given considerable attention. Accordingly, the demand of driving recording systems and rear view camera systems has been increasing. The driving recording systems can provide evidences for clarifying the responsibility of traffic accidents, and the rear view camera systems having a camera installed at a rear end of a car can prevent the occurrence of accidents when backing the car.

A conventional optical system employed in vehicle photographing devices has a poor resolving power, and the periphery of the image is seriously distorted. However, the image recognition is one of the most important characteristics required by the vehicle photographing devices. The conventional optical system cannot satisfy the requirement of the vehicle photographing devices.

Other conventional optical systems with four-element lens structure are disclosed. However, due to the surface shapes of the lens elements and the distribution of the refractive powers, the distribution of the refractive powers of the optical system cannot be balanced, and the high-order aberration and the sensitivity cannot be effectively reduced. Furthermore, when a larger field of view is provided by the optical system, an excessively low peripheral illumination is caused. As a result, the image quality of the optical system is hardly to be enhanced.

SUMMARY

According to one aspect of the present disclosure, a wide-angle image capturing lens assembly includes, in order from an object side to an image side, a first lens element, a second lens element, a third lens element and a fourth lens element. The first lens element with negative refractive power has an image-side surface being concave in a paraxial region thereof. The second lens element with refractive power has an image-side surface being convex in a paraxial region thereof. The third lens element has positive refractive power. The fourth lens element with refractive power has an object-side surface being concave in a paraxial region thereof and an image-side surface being convex in a paraxial region thereof. Both of the object-side surface and the image-side surface of the fourth lens element are aspheric. At least one of the object-side surface and the image-side surface of the fourth lens element has at least one inflection point in an off-axis region thereof. The wide-angle image capturing lens assembly has a total of four lens elements with refractive power. When a focal length of the wide-angle image capturing lens assembly is f, a focal length of the second lens element is f2, a focal length of the third lens element is f3, a focal length of the fourth lens element is f4, a curvature radius of an image-side surface of the third lens element is R6, and a curvature radius of the object-side surface of the fourth lens element is R7, the following relationships are satisfied:

$$1.5 < |f2/f3|;$$

$$-0.25 < f/f4;\ \text{and}$$

$$|(R6+R7)/(R6-R7)| < 25.$$

According to another aspect of the present disclosure, an image capturing device includes the aforementioned wide-angle image capturing lens assembly and an image sensor. The image sensor is located on the image side of the wide-angle image capturing lens assembly.

According to yet another aspect of the present disclosure, a vehicle device includes the aforementioned image capturing device.

According to further another aspect of the present disclosure, a wide-angle image capturing lens assembly includes, in order from an object side to an image side, a first lens element, a second lens element, a third lens element and a fourth lens element. The first lens element with negative refractive power has an image-side surface being concave in a paraxial region thereof. The second lens element with positive refractive power has an image-side surface being convex in a paraxial region thereof. The third lens element has positive refractive power. The fourth lens element with refractive power has an object-side surface being concave in a paraxial region thereof and an image-side surface being convex in a paraxial region thereof. Both of the object-side surface and the image-side surface of the fourth lens element are aspheric. At least one of the object-side surface and the image-side surface of the fourth lens element has at least one inflection point in an off-axis region thereof. The wide-angle image capturing lens assembly has a total of four lens elements with refractive power. There is an air gap in a paraxial region between any two of the first lens element, the second lens element, the third lens element and the fourth lens element that are adjacent to each other. When a focal length of the wide-angle image capturing lens assembly is f, a focal length of the second lens element is f2, a focal length of the third lens element is f3, a focal length of the fourth lens element is f4, an axial distance between the first lens element and the second lens element is T12, a central thickness of the second lens element is CT2, and an Abbe number of the second lens element is V2, the following relationships are satisfied:

$$1.5 < |f2/f3|;$$

$$-0.45 < f/f4;$$

$$T12/CT2 < 1.20;\ \text{and}$$

$$V2 < 32.$$

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
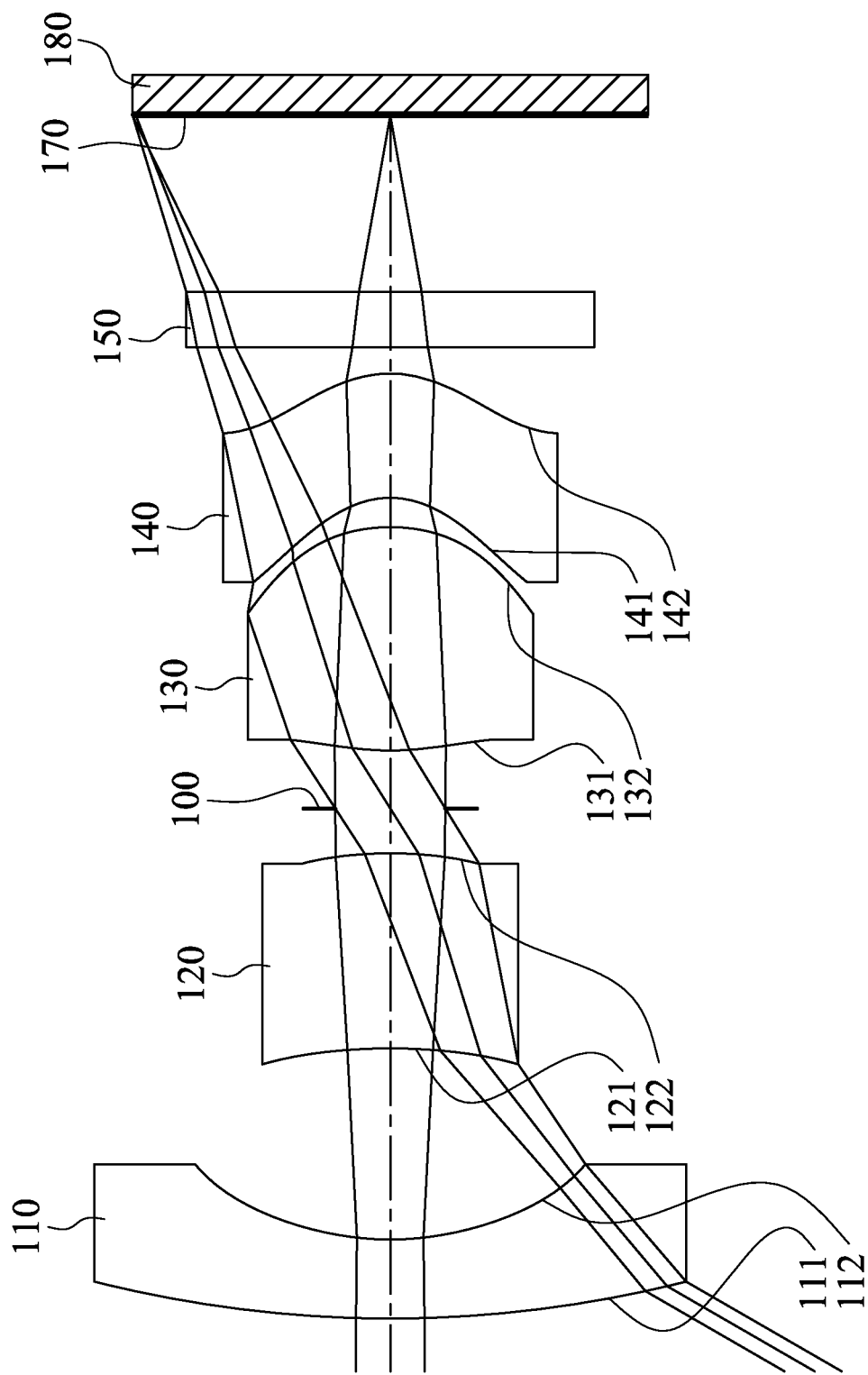
FIG. 1 is a schematic view of an image capturing device according to the 1st embodiment of the present disclosure.

A wide-angle image capturing lens assembly includes, in order from an object side to an image side, a first lens element, a second lens element, a third lens element and a fourth lens element. The wide-angle image capturing lens assembly has a total of four lens elements with refractive power.

Of the first lens element, the second lens element, the third lens element and the fourth lens element of the wide-angle image capturing lens assembly, there is an air gap in a paraxial region between every pair of lens elements that are adjacent to each other. An air gap is between two adjacent surfaces of any two adjacent lens elements, that is, each of the first through fourth lens elements of the wide-angle image capturing lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the wide-angle image capturing lens assembly. Therefore, each of the four lens elements of the wide-angle image capturing lens assembly is separated from each other in the present disclosure for improving the problem generated by the cemented lens elements.

The first lens element with negative refractive power has an image-side surface being concave in a paraxial region thereof. Therefore, it is favorable for providing the wide-angle image capturing lens assembly with a larger field of view and obtaining more of the image scene.

The second lens element can have positive refractive power and an object-side surface being concave in a paraxial region thereof, and has an image-side surface being convex in a paraxial region thereof. Therefore, it is favorable for providing the wide-angle image capturing lens assembly with the positive refractive power as it needs to be, and the astigmatism can be corrected.

The third lens element has positive refractive power, and can have an object-side surface being convex in a paraxial region thereof and an image-side surface being convex in a paraxial region thereof. Therefore, the sensitivity and the spherical aberration of the wide-angle image capturing lens assembly can be reduced.

The fourth lens element can have positive refractive power, and has an object-side surface being concave in a paraxial region thereof and an image-side surface being convex in a paraxial region thereof. At least one of the object-side surface and the image-side surface of the fourth lens element has at least one inflection point in an off-axis region thereof. Therefore, the sensitivity of the wide-angle image capturing lens assembly can be effectively reduced, and the astigmatism can be further corrected. Moreover, an excessively low peripheral illumination caused by the wide-angle view can be compensated.

When a focal length of the second lens element is f2, and a focal length of the third lens element is f3, the following relationship is satisfied: $1.5<|f2/f3|$. Therefore, the distribution of the refractive powers of the wide-angle image capturing lens assembly can be balanced, and the high-order aberration can be reduced. Preferably, the following relationship can be satisfied: $3.0<|f2/f3|$.

When a focal length of the wide-angle image capturing lens assembly is f, and a focal length of the fourth lens element is f4, the following relationship is satisfied: $-0.45<f/f4$. Therefore, the sensitivity of the wide-angle image capturing lens assembly can be reduced, and the manufacturing yield rate can be improved. Preferably, the following relationship can be satisfied: $-0.25<f/f4$.

When a curvature radius of the image-side surface of the third lens element is R6, and a curvature radius of the object-side surface of the fourth lens element is R7, the following relationship can be satisfied: $|(R6+R7)/(R6-R7)|<25$. Therefore, the aberration can be corrected, and the image quality can be effectively improved.

When an axial distance between the first lens element and the second lens element is T12, and a central thickness of the second lens element is CT2, the following relationship can be satisfied: $T12/CT2<1.20$. Therefore, it is favorable for assembling the lens elements and increasing the yield rate, and the total track length can be effectively reduced.

When an Abbe number of the second lens element is V2, the following relationship can be satisfied: $V2<32$. Therefore, the chromatic aberration of the wide-angle image capturing lens assembly can be corrected, and the image quality can be maintained.

When a maximal field of view of the wide-angle image capturing lens assembly is FOV, the following relationship can be satisfied: $120$ degrees $FOV<200$ degrees. Therefore, it is favorable for providing the wide-angle image capturing lens assembly with a larger field of view and obtaining more of the image scene.

When a curvature radius of the object-side surface of the third lens element is R5, and the curvature radius of the image-side surface of the third lens element is R6, the following relationship can be satisfied: $-2.3 < R5/R6 < -1.0$. Therefore, the spherical aberration can be effectively corrected, and the image quality can be maintained.

When the focal length of the wide-angle image capturing lens assembly is f, and a curvature radius of the image-side surface of the fourth lens element is R8, the following relationship can be satisfied: $|R8/f| < 0.90$. Therefore, the aberration of the wide-angle image capturing lens assembly can be corrected, and the image quality can be enhanced.

When a central thickness of the third lens element is CT3, and a central thickness of the fourth lens element is CT4, the following relationship can be satisfied: $0.75 < CT3/CT4 < 2.50$. Therefore, it is favorable for manufacturing the lens elements and increasing the manufacturing yield rate.

The wide-angle image capturing lens assembly can further include a stop, such as an aperture stop, and the stop is located between the second lens element and the third lens element. When an axial distance between the stop and the image-side surface of the fourth lens element is SD, and an axial distance between an object-side surface of the first lens element and the image-side surface of the fourth lens element is TD, the following relationship can be satisfied: $0.30 < SD/TD < 0.55$. Therefore, the telecentricity and the wide-angle character of the wide-angle image capturing lens assembly can be balanced, and the total track length thereof is not excessively long.

When the axial distance between the first lens element and the second lens element is T12, and an axial distance between the second lens element and the third lens element is T23, the following relationship can be satisfied: $0.20 < T23/T12 < 1.50$. Therefore, it is favorable for assembling the lens elements, and the total track length can be effectively maintained.

According to the wide-angle image capturing lens assembly of the present disclosure, the lens elements thereof can be made of glass or plastic material. When the lens elements are made of glass material, the distribution of the refractive powers of the wide-angle image capturing lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the wide-angle image capturing lens assembly can also be reduced.

According to the wide-angle image capturing lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the wide-angle image capturing lens assembly of the present disclosure, the wide-angle image capturing lens assembly can include at least one stop, such as an aperture stop, a glare stop or a field stop. Said glare stop or said field stop is for eliminating the stray light and thereby improving the image resolution thereof.

According to the wide-angle image capturing lens assembly of the present disclosure, an aperture stop can be configured as a front stop or a middle stop. A front stop disposed between an imaged object and the first lens element can provide a longer distance between an exit pupil of the wide-angle image capturing lens assembly and the image plane and thereby improves the image-sensing efficiency of an image sensor. A middle stop disposed between the first lens element and the image plane is favorable for enlarging the field of view of the wide-angle image capturing lens assembly and thereby provides a wider field of view for the same.

According to the wide-angle image capturing lens assembly of the present disclosure, the wide-angle image capturing lens assembly can be optionally applied to moving focus optical systems.

According to the present disclosure, an image capturing device is provided. The image capturing device includes the aforementioned wide-angle image capturing lens assembly and an image sensor. The image sensor is located on the image side of the aforementioned wide-angle image capturing lens assembly, that is, the image sensor can be located on or near an image plane of the aforementioned wide-angle image capturing lens assembly. The first lens element provides negative refractive power, the third lens element provides positive refractive power, and the negative refractive power of the first lens element and the positive refractive power of the third lens element are balanced by the refractive powers of the second lens element and the fourth lens element. Therefore, the distribution of the refractive powers of the wide-angle image capturing lens assembly can be balanced, and the high-order aberration and the sensitivity can be reduced. Furthermore, at least one of the object-side surface and the image-side surface of the fourth lens element has at least one inflection point in an off-axis region thereof. Therefore, an excessively low peripheral illumination caused by the wide-angle view can be compensated. Preferably, the image capturing device can further include a barrel member, a holding member or a combination thereof.

According to the present disclosure, a vehicle device is provided. The vehicle device includes the aforementioned image capturing device. Therefore, an excellent image quality can be obtained. Preferably, the vehicle device can further include but not limited to a control unit, a display, a storage unit, a random access memory unit (RAM), a read only memory unit (ROM) or a combination thereof.

According to the above description of the present disclosure, the following 1st-10th specific embodiments are provided for further explanation.

1st Embodiment

Figure 2:
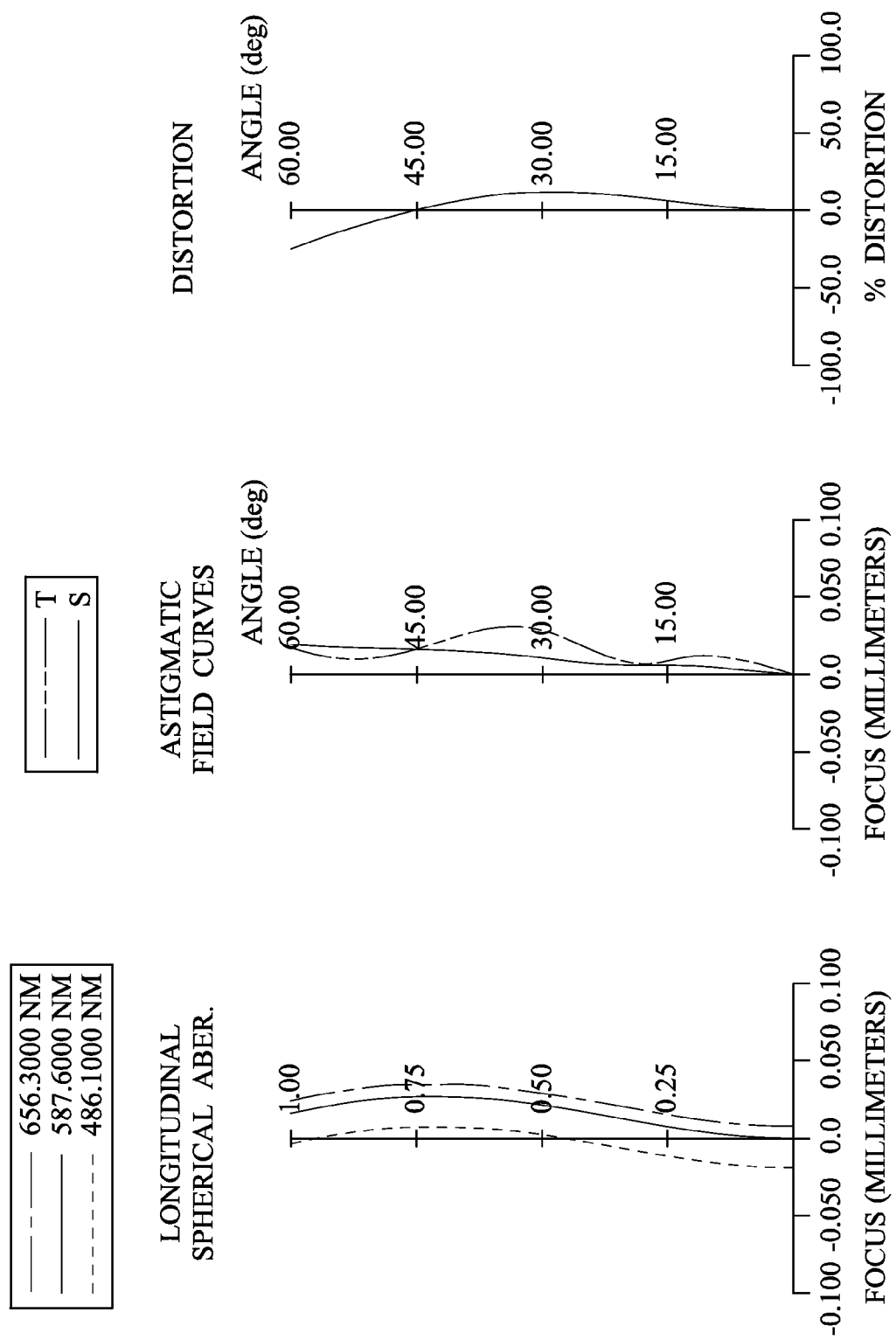
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes a wide-angle image capturing lens assembly (its reference numeral is omitted) and an image sensor 180. The wide-angle image capturing lens assembly includes, in order from an object side to an image side, a first lens element 110, a second lens element 120, an aperture stop 100, a third lens element 130, a fourth lens element 140, an IR-cut filter 150 and an image plane 170. The image sensor 180 is located on or near the image plane 170 of the wide-angle image capturing lens assembly. The wide-angle image capturing lens assembly has a total of four lens elements (110-140) with refractive power. There is an air gap in a paraxial region between any two of the first lens element 110, the second lens element 120, the third lens element 130 and the fourth lens element 140 that are adjacent to each other.

The first lens element 110 with negative refractive power has an object-side surface 111 being convex in a paraxial region thereof and an image-side surface 112 being concave in a paraxial region thereof. The first lens element 110 is made of glass material and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. Furthermore, both of the object-side surface 141 and the image-side surface 142 of the fourth lens element 140 have at least one inflection point in an off-axis region thereof.

The IR-cut filter 150 is made of glass material and located between the fourth lens element 140 and the image plane 170, and will not affect a focal length of the wide-angle image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the wide-angle image capturing lens assembly of the image capturing device according to the 1st embodiment, when the focal length of the wide-angle image capturing lens assembly is f, an f-number of the wide-angle image capturing lens assembly is Fno, and half of a maximal field of view of the wide-angle image capturing lens assembly is HFOV, these parameters have the following values: f=0.74 mm; Fno=2.85; and HFOV=60.0 degrees.

In the wide-angle image capturing lens assembly of the image capturing device according to the 1st embodiment, when an Abbe number of the second lens element 120 is V2, the following relationship is satisfied: V2=23.3.

In the wide-angle image capturing lens assembly of the image capturing device according to the 1st embodiment, when an axial distance between the first lens element 110 and the second lens element 120 is T12, and a central thickness of the second lens element 120 is CT2, the following relationship is satisfied: T12/CT2=0.98.

In the wide-angle image capturing lens assembly of the image capturing device according to the 1st embodiment, when the axial distance between the first lens element 110 and the second lens element 120 is T12, and an axial distance between the second lens element 120 and the third lens element 130 is T23, the following relationship is satisfied: T23/T12=0.54.

In the wide-angle image capturing lens assembly of the image capturing device according to the 1st embodiment, when a central thickness of the third lens element 130 is CT3, and a central thickness of the fourth lens element 140 is CT4, the following relationship is satisfied: CT3/CT4=1.80.

In the wide-angle image capturing lens assembly of the image capturing device according to the 1st embodiment, when a curvature radius of the object-side surface 131 of the third lens element 130 is R5, and a curvature radius of the image-side surface 132 of the third lens element 130 is R6, the following relationship is satisfied: R5/R6=−1.86.

In the wide-angle image capturing lens assembly of the image capturing device according to the 1st embodiment, when the curvature radius of the image-side surface 132 of the third lens element 130 is R6, and a curvature radius of the object-side surface 141 of the fourth lens element 140 is R7, the following relationship is satisfied: |(R6+R7)/(R6−R7)|=3.20.

In the wide-angle image capturing lens assembly of the image capturing device according to the 1st embodiment, when the focal length of the wide-angle image capturing lens assembly is f, and a curvature radius of the image-side surface 142 of the fourth lens element 140 is R8, the following relationship is satisfied: |R8/f|=0.60.

In the wide-angle image capturing lens assembly of the image capturing device according to the 1st embodiment, when a focal length of the second lens element 120 is f2, and a focal length of the third lens element 130 is f3, the following relationship is satisfied: |f2/f3|=6.03.

In the wide-angle image capturing lens assembly of the image capturing device according to the 1st embodiment, when the focal length of the wide-angle image capturing lens assembly is f, and a focal length of the fourth lens element 140 is f4, the following relationship is satisfied: f/f4=0.23.

In the wide-angle image capturing lens assembly of the image capturing device according to the 1st embodiment, when an axial distance between the aperture stop 100 and the image-side surface 142 of the fourth lens element 140 is SD, and an axial distance between the object-side surface 111 of the first lens element 110 and the image-side surface 142 of the fourth lens element 140 is TD, the following relationship is satisfied: SD/TD=0.46.

In the wide-angle image capturing lens assembly of the image capturing device according to the 1st embodiment, when the maximal field of view of the wide-angle image capturing lens assembly is FOV, the following relationship is satisfied: FOV=120 degrees.

The detailed optical data of the 1st embodiment are shown in Table 1 and the aspheric surface data are shown in Table 2 below.

TABLE 1

1st Embodiment
f = 0.74 mm, Fno = 2.85, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.359 | ASP | 0.300 | Glass | 1.613 | 59.0 | −2.53 |
| 2 | | 1.114 | ASP | 0.725 | | | | |
| 3 | Lens 2 | −2.180 | ASP | 0.740 | Plastic | 1.640 | 23.3 | 5.61 |
| 4 | | −1.536 | ASP | 0.170 | | | | |
| 5 | Ape. Stop | Plano | | 0.220 | | | | |
| 6 | Lens 3 | 1.198 | ASP | 0.847 | Plastic | 1.535 | 55.7 | 0.93 |
| 7 | | −0.645 | ASP | 0.111 | | | | |
| 8 | Lens 4 | −0.337 | ASP | 0.471 | Plastic | 1.634 | 23.8 | 3.18 |
| 9 | | −0.446 | ASP | 0.100 | | | | |
| 10 | IR-cut filter | Plano | | 0.210 | Glass | 1.517 | 64.2 | — |
| 11 | | Plano | | 0.672 | | | | |
| 12 | Image | Plano | | — | | | | |

Note:
Reference wavelength is 587.6 nm (d-line).

TABLE 2

| Aspheric Coefficients | | | | |
|---|---|---|---|---|
| Surface # | 1 | 2 | 3 | 4 |
| k = | 2.0866E+00 | 8.8882E−01 | −2.1991E+00 | −8.0022E+01 |
| A4 = | −1.5939E−02 | −3.0738E−01 | −1.7926E−01 | −2.0696E+00 |
| A6 = | 1.3334E−02 | 1.3359E−01 | 1.8236E+00 | 1.0438E+01 |
| A8 = | −7.3368E−03 | 7.8721E−01 | −1.0315E+01 | −3.9430E+01 |
| A10 = | 1.5827E−03 | −1.5876E+00 | 1.4305E+01 | 4.5976E+01 |
| A12 = | | −3.2235E−01 | | |
| A14 = | | 3.2946E+00 | | |
| A16 = | | −3.0956E+00 | | |
| Surface # | 6 | 7 | 8 | 9 |
| k = | −2.0050E+00 | −6.2863E−01 | −1.2355E+00 | −3.3466E+00 |
| A4 = | −3.9002E−01 | −1.0310E+00 | −7.9110E−01 | −2.2144E+00 |
| A6 = | −1.3809E+01 | −2.1711E+00 | 1.3846E+01 | 1.4151E+01 |
| A8 = | 3.2341E+02 | −3.3906E+01 | −1.0165E+02 | −3.0438E+01 |
| A10 = | −5.2182E+03 | 4.8727E+02 | 5.0853E+02 | 2.7071E+01 |
| A12 = | 4.6528E+04 | −2.1570E+03 | −1.3587E+03 | 1.3448E+01 |
| A14 = | −2.0833E+05 | 4.4202E+03 | 1.7294E+03 | −5.6235E+01 |
| A16 = | 3.6492E+05 | −3.6676E+03 | −8.3694E+02 | 3.9481E+01 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
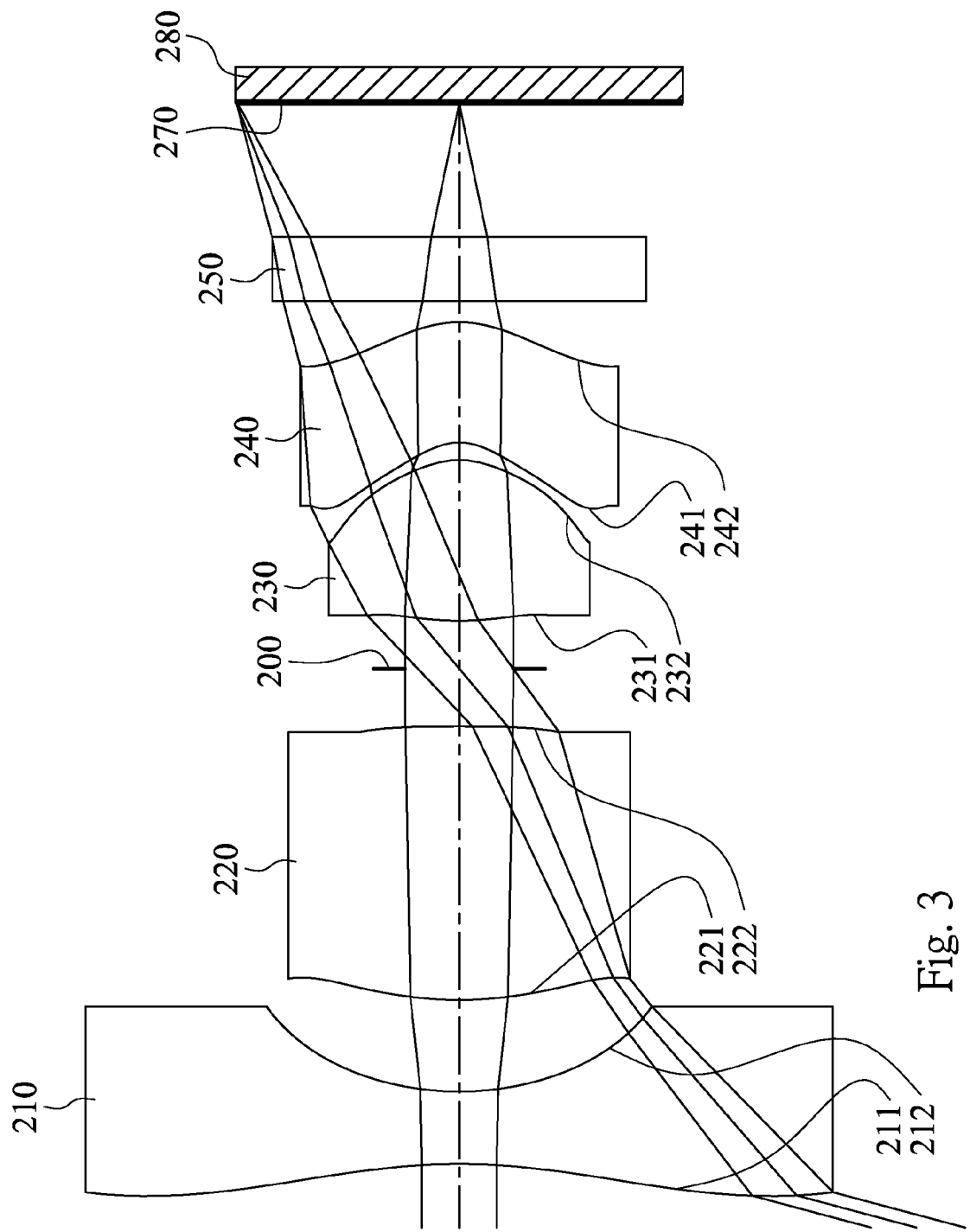
FIG. 3 is a schematic view of an image capturing device according to the 2nd embodiment of the present disclosure.
Figure 4:
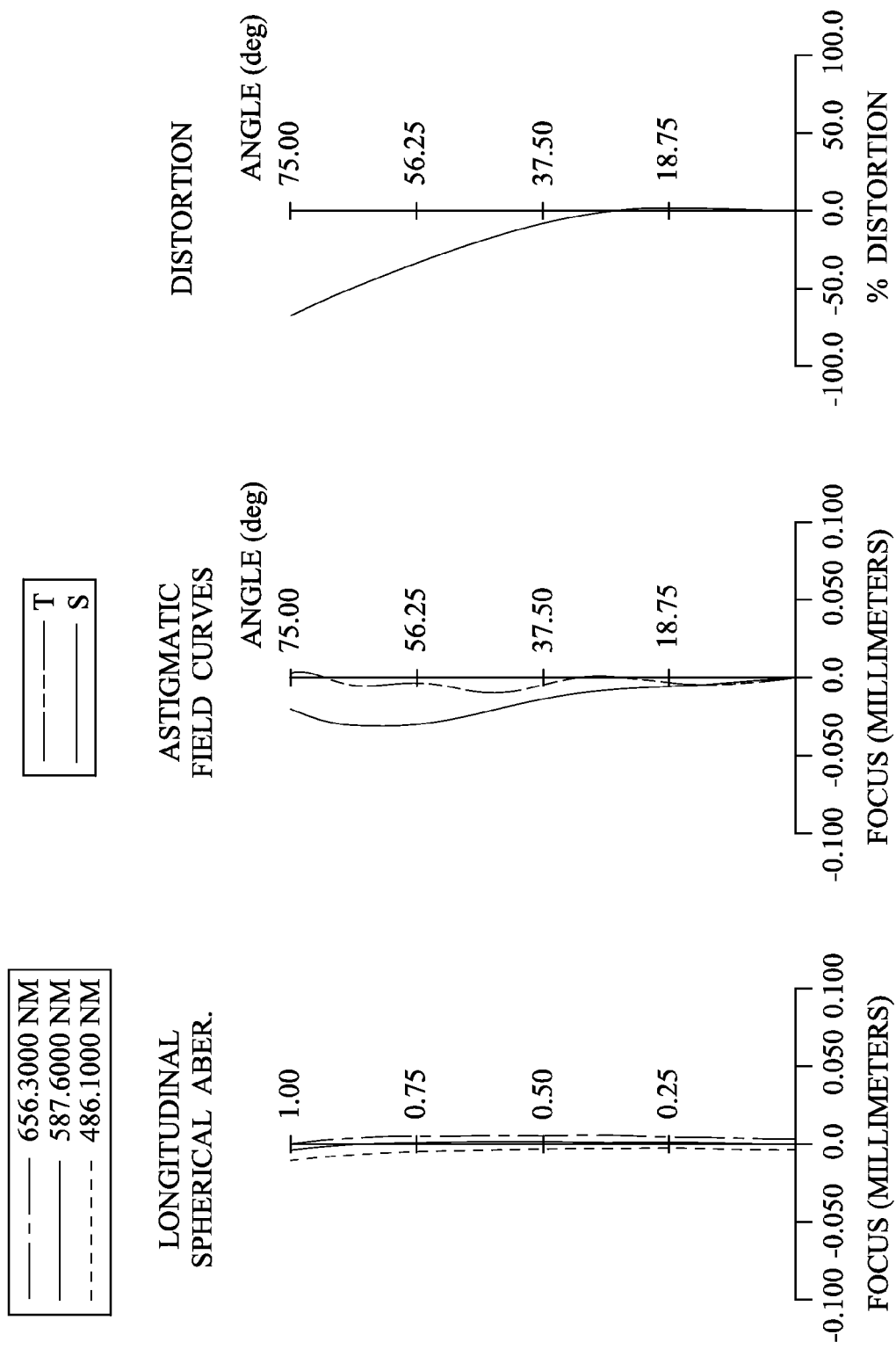
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes a wide-angle image capturing lens assembly (its reference numeral is omitted) and an image sensor 280. The wide-angle image capturing lens assembly includes, in order from an object side to an image side, a first lens element 210, a second lens element 220, an aperture stop 200, a third lens element 230, a fourth lens element 240, an IR-cut filter 250 and an image plane 270. The image sensor 280 is located on or near the image plane 270 of the wide-angle image capturing lens assembly. The wide-angle image capturing lens assembly has a total of four lens elements (210-240) with refractive power. There is an air gap in a paraxial region between any two of the first lens element 210, the second lens element 220, the third lens element 230 and the fourth lens element 240 that are adjacent to each other.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of glass material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric. Furthermore, both of the object-side surface 241 and the image-side surface 242 of the fourth lens element 240 have at least one inflection point in an off-axis region thereof. The IR-cut filter 250 is made of glass material and located between the fourth lens element 240 and the image plane 270, and will not affect a focal length of the wide-angle image capturing lens assembly.

The detailed optical data of the 2nd embodiment are shown in Table 3 and the aspheric surface data are shown in Table 4 below.

TABLE 3

2nd Embodiment
f = 0.86 mm, Fno = 2.45, HFOV = 75.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.924 | ASP | 0.340 | Plastic | 1.544 | 55.9 | −1.63 |
| 2 | | 1.327 | ASP | 0.432 | | | | |
| 3 | Lens 2 | 1.731 | ASP | 1.288 | Plastic | 1.607 | 26.6 | 2.68 |
| 4 | | −19.400 | ASP | 0.272 | | | | |
| 5 | Ape. Stop | Plano | | 0.226 | | | | |
| 6 | Lens 3 | 1.381 | ASP | 0.757 | Glass | 1.613 | 59.0 | 0.60 |
| 7 | | −0.395 | ASP | 0.083 | | | | |
| 8 | Lens 4 | −0.254 | ASP | 0.566 | Plastic | 1.650 | 21.4 | −3.97 |
| 9 | | −0.529 | ASP | 0.100 | | | | |
| 10 | IR-cut filter | Plano | | 0.300 | Glass | 1.517 | 64.2 | — |
| 11 | | Plano | | 0.634 | | | | |
| 12 | Image | Plano | | — | | | | |

Note:
Reference wavelength is 587.6 nm (d-line).

Effective radius of Surface 8 is 0.700 mm.

TABLE 4

Aspheric Coefficients

| Surface # | 1 | 2 | 3 | 4 |
|---|---|---|---|---|
| k = | −5.3329E+00 | −1.3969E+01 | 2.0818E+00 | −5.0000E+01 |
| A4 = | 4.3647E−02 | 5.4864E−01 | −2.3685E−01 | −3.2849E−01 |
| A6 = | −6.7986E−03 | −1.4103E+00 | 4.8079E−01 | −8.3138E−01 |
| A8 = | 1.5964E−03 | 5.2229E+00 | −1.6500E+00 | −3.1138E+00 |
| A10 = | −8.4995E−04 | −1.2320E+01 | 1.3211E+00 | 6.8233E+01 |
| A12 = | 2.7839E−04 | 1.7110E+01 | 4.4318E−01 | −3.7924E+02 |
| A14 = | −4.0750E−05 | −1.2650E+01 | −1.9973E+00 | 1.0587E+03 |
| A16 = | 2.1378E−06 | 3.9008E+00 | 1.0808E+00 | −1.2424E+03 |

| Surface # | 6 | 7 | 8 | 9 |
|---|---|---|---|---|
| k = | 5.4702E+00 | −2.4746E+00 | −2.2176E+00 | −1.7320E+00 |
| A4 = | −1.1056E+00 | 8.9263E−01 | 1.0431E+00 | 7.7624E−01 |
| A6 = | 4.2061E+00 | −5.6462E+00 | 8.5945E+00 | 1.3911E+00 |
| A8 = | −1.6767E+02 | 3.5436E+01 | −1.1212E+02 | −9.5019E+00 |
| A10 = | 2.3134E+03 | −5.2044E+02 | 4.0064E+02 | 1.9778E+01 |
| A12 = | −1.8421E+04 | 2.8395E+03 | −5.2906E+02 | −1.0413E+01 |
| A14 = | 7.0994E+04 | −6.6884E+03 | 1.2297E+02 | −1.9498E+01 |
| A16 = | −1.0135E+05 | 5.9384E+03 | 1.6103E+02 | 2.2888E+01 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f (mm) | 0.86 | R5/R6 | −3.49 |
| Fno | 2.45 | |(R6 + R7)/(R6 − R7)| | 4.59 |
| HFOV (deg.) | 75.0 | |R8/f| | 0.61 |
| V2 | 26.6 | |f2/f3| | 4.47 |
| T12/CT2 | 0.34 | f/f4 | −0.22 |
| T23/T12 | 1.15 | SD/TD | 0.41 |
| CT3/CT4 | 1.34 | FOV (deg.) | 150.0 |

3rd Embodiment

Figure 5:
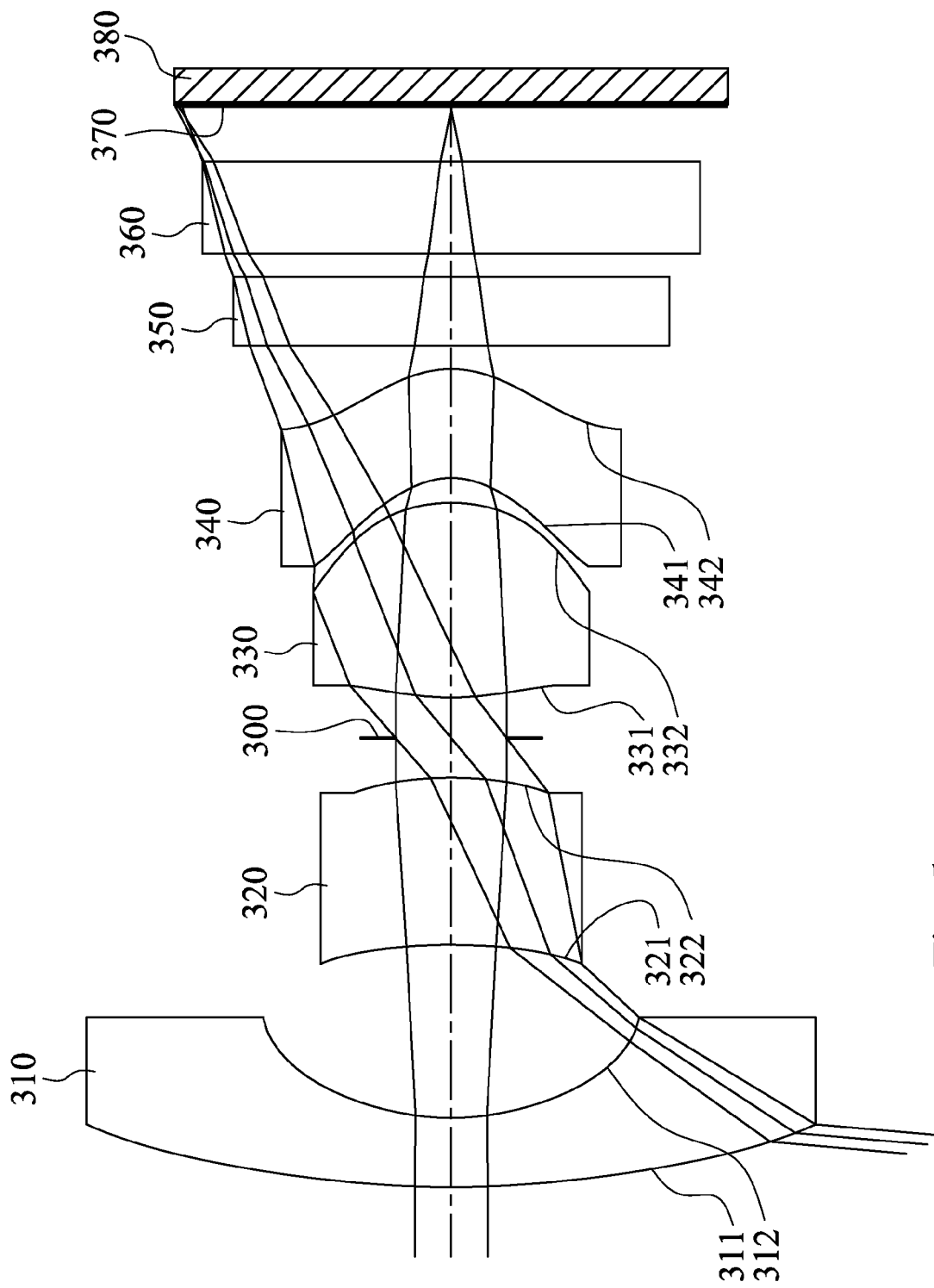
FIG. 5 is a schematic view of an image capturing device according to the 3rd embodiment of the present disclosure.
Figure 6:
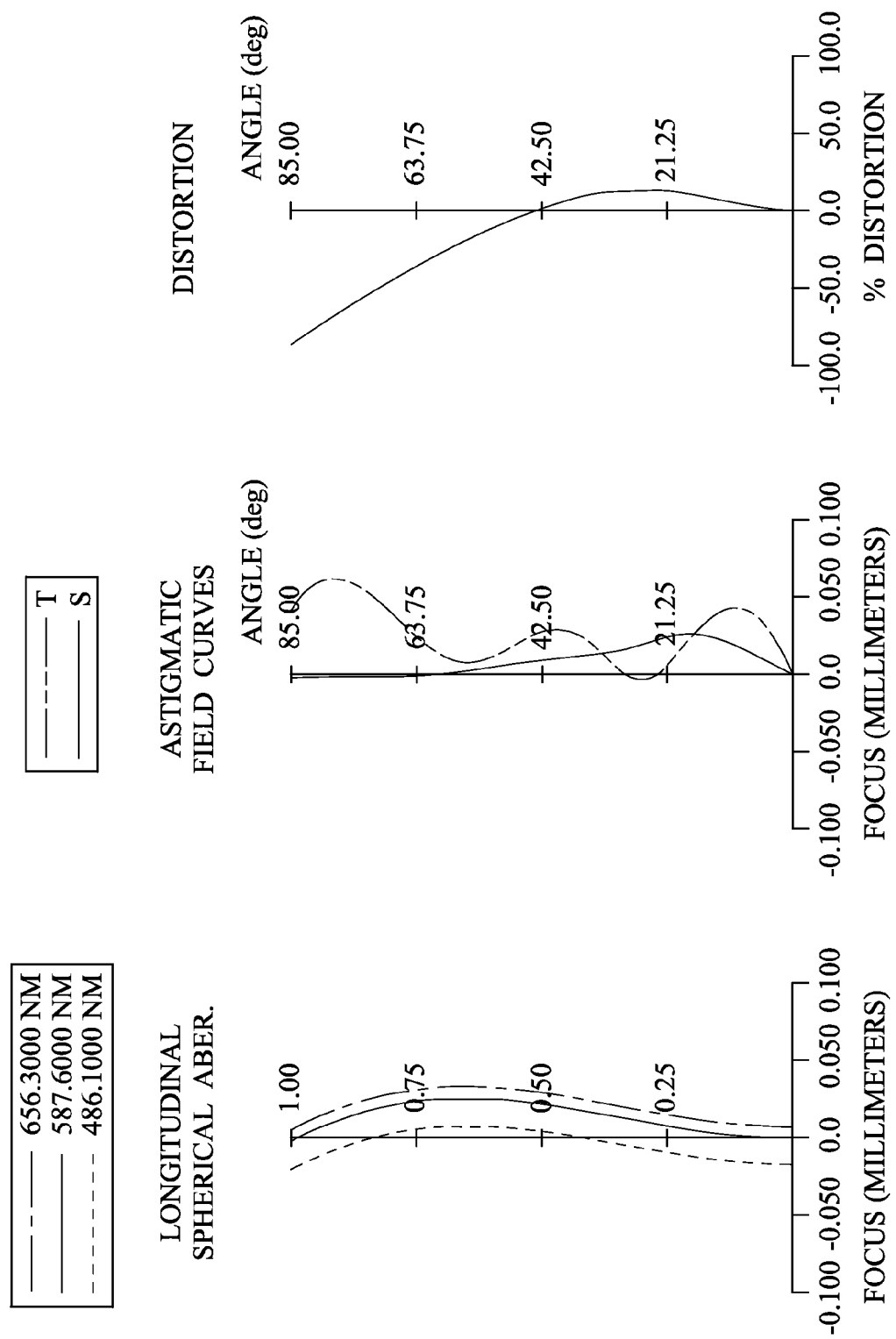
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes a wide-angle image capturing lens assembly (its reference numeral is omitted) and an image sensor 380. The wide-angle image capturing lens assembly includes, in order from an object side to an image side, a first lens element 310, a second lens element 320, an aperture stop 300, a third lens element 330, a fourth lens element 340, an IR-cut filter 350, a cover glass 360 and an image plane 370. The image sensor 380 is located on or near the image plane 370 of the wide-angle image capturing lens assembly. The wide-angle image capturing lens assembly has a total of four lens elements (310-340) with refractive power. There is an air gap in a paraxial region between any two of the first lens element 310, the second lens element 320, the third lens element 330 and the fourth lens element 340 that are adjacent to each other.

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. Furthermore, the object-side surface 341 and the image-side surface 342 of the fourth lens element 340 have at least one inflection point in an off-axis region thereof.

The IR-cut filter 350 and the cover glass 360 are made of glass material and located in order between the fourth lens element 340 and the image plane 370, and will not affect a focal length of the wide-angle image capturing lens assembly.

The detailed optical data of the 3rd embodiment are shown in Table 5 and the aspheric surface data are shown in Table 6 below.

TABLE 5

3rd Embodiment
f = 0.77 mm, Fno = 2.45, HFOV = 85.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.359 | ASP | 0.300 | Plastic | 1.544 | 55.9 | −2.84 |
| 2 | | 1.114 | ASP | 0.750 | | | | |
| 3 | Lens 2 | −2.438 | ASP | 0.725 | Plastic | 1.640 | 23.3 | 5.63 |
| 4 | | −1.623 | ASP | 0.172 | | | | |
| 5 | Ape. Stop | Plano | | 0.176 | | | | |
| 6 | Lens 3 | 1.229 | ASP | 0.845 | Plastic | 1.535 | 55.7 | 0.93 |
| 7 | | −0.640 | ASP | 0.107 | | | | |
| 8 | Lens 4 | −0.337 | ASP | 0.473 | Plastic | 1.634 | 23.8 | 3.20 |
| 9 | | −0.446 | ASP | 0.100 | | | | |
| 10 | IR-cut filter | Plano | | 0.300 | Glass | 1.517 | 64.2 | — |
| 11 | | Plano | | 0.100 | | | | |
| 12 | Cover glass | Plano | | 0.400 | Glass | 1.517 | 64.2 | — |
| 13 | | Plano | | 0.246 | | | | |
| 14 | Image | Plano | | — | | | | |

Note:
Reference wavelength is 587.6 nm (d-line).

TABLE 6

| Aspheric Coefficients | | | | |
|---|---|---|---|---|
| Surface # | 1 | 2 | 3 | 4 |
| k = | 2.4959E+00 | 8.3814E-01 | -1.5412E+00 | -3.8862E+01 |
| A4 = | -2.5078E-02 | -2.9561E-01 | 1.6464E-02 | -1.0909E+00 |
| A6 = | 6.8101E-03 | 1.6422E-01 | -1.4726E-01 | 8.0992E-01 |
| A8 = | -6.5487E-05 | 3.8409E-01 | -1.9342E+00 | 4.7334E+00 |
| A10 = | -5.1900E-05 | -6.4352E-01 | 1.7624E+00 | -1.1929E+01 |
| Surface # | 6 | 7 | 8 | 9 |
| k = | -1.0000E+00 | -8.6072E-01 | -1.7253E+00 | -3.6986E+00 |
| A4 = | -7.1436E-01 | 1.2688E-01 | -2.7498E-01 | -1.8766E+00 |
| A6 = | 9.7476E-01 | -1.0874E+01 | -2.1267E-01 | 1.1118E+01 |
| A8 = | -1.3819E+01 | 3.6033E+01 | -1.2120E+01 | -2.4338E+01 |
| A10 = | 4.4517E+01 | -3.5425E+01 | 7.5144E+01 | 2.5642E+01 |
| A12 = | | | -9.8420E+01 | -1.0594E+01 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f (mm) | 0.77 | R5/R6 | -1.92 |
| Fno | 2.45 | \|(R6 + R7)/(R6 - R7)\| | 3.23 |
| HFOV (deg.) | 85.0 | \|R8/f\| | 0.58 |
| V2 | 23.3 | \|f2/f3\| | 6.05 |
| T12/CT2 | 1.03 | f/f4 | 0.24 |
| T23/T12 | 0.46 | SD/TD | 0.45 |
| CT3/CT4 | 1.79 | FOV (deg.) | 170.0 |

4th Embodiment

Figure 7:
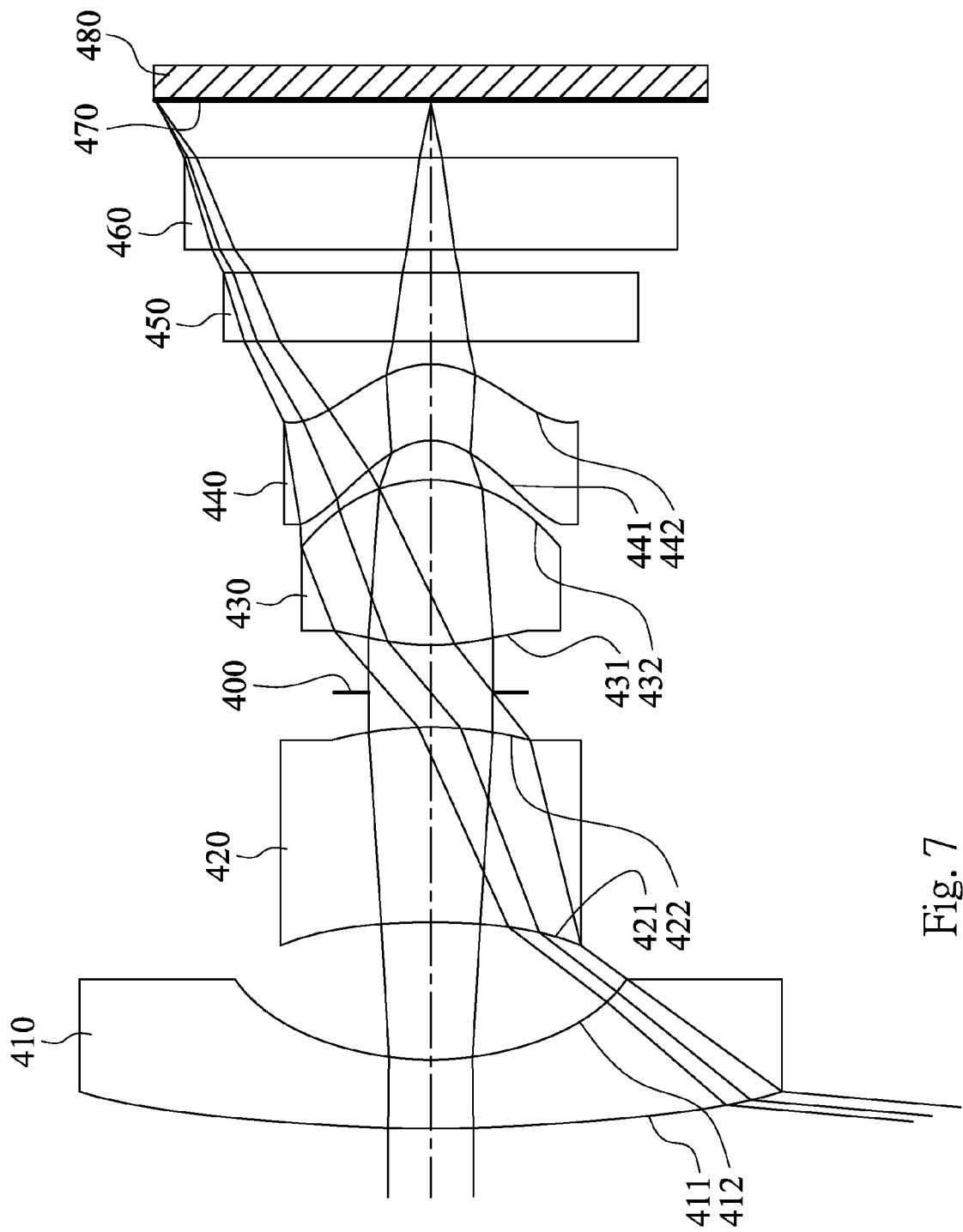
FIG. 7 is a schematic view of an image capturing device according to the 4th embodiment of the present disclosure.
Figure 8:
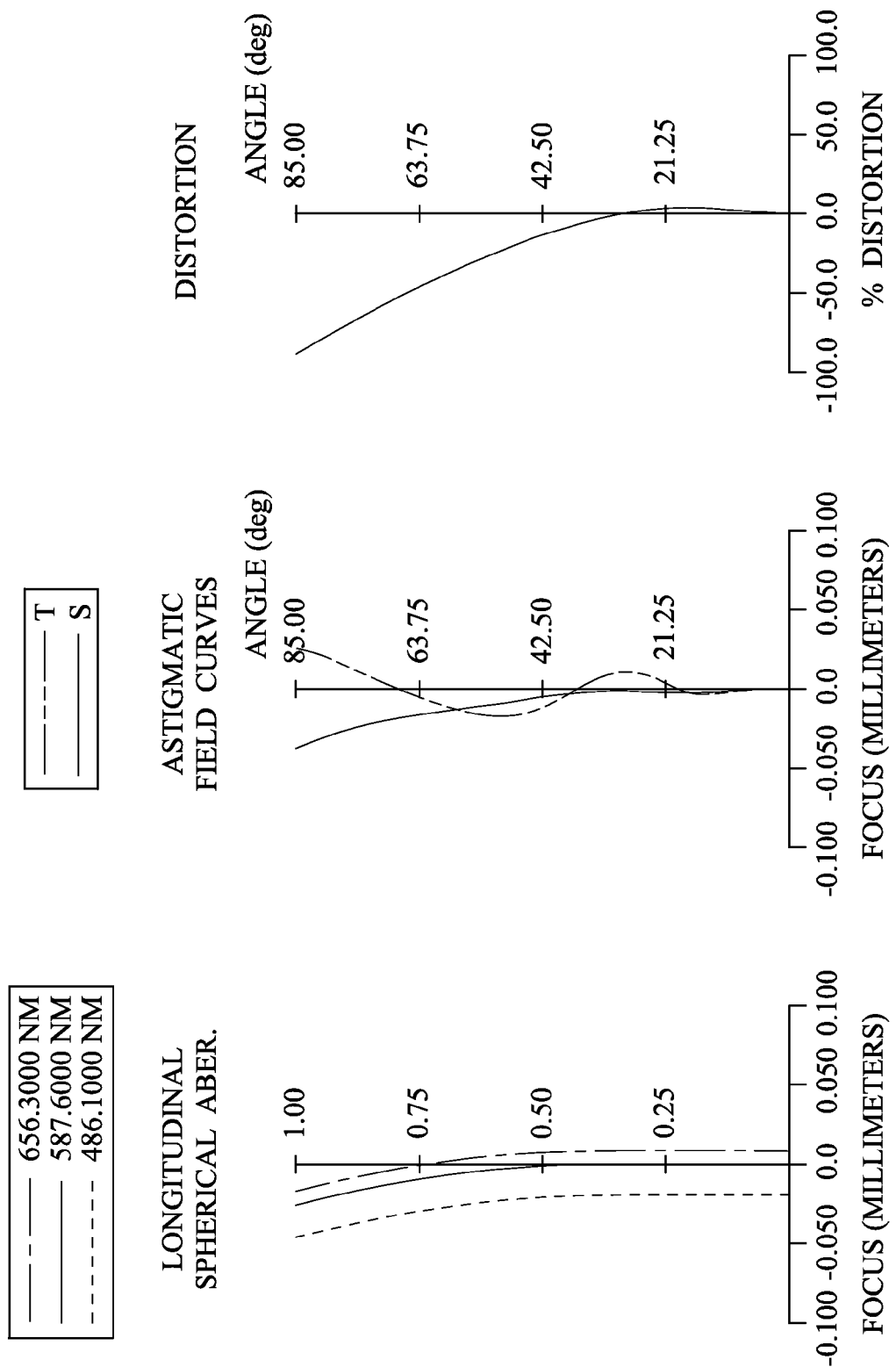
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes a wide-angle image capturing lens assembly (its reference numeral is omitted) and an image sensor 480. The wide-angle image capturing lens assembly includes, in order from an object side to an image side, a first lens element 410, a second lens element 420, an aperture stop 400, a third lens element 430, a fourth lens element 440, an IR-cut filter 450, a cover glass 460 and an image plane 470. The image sensor 480 is located on or near the image plane 470 of the wide-angle image capturing lens assembly. The wide-angle image capturing lens assembly has a total of four lens elements (410-440) with refractive power. There is an air gap in a paraxial region between any two of the first lens element 410, the second lens element 420, the third lens element 430 and the fourth lens element 440 that are adjacent to each other.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. Furthermore, the object-side surface 441 and the image-side surface 442 of the fourth lens element 440 have at least one inflection point in an off-axis region thereof.

The IR-cut filter 450 and the cover glass 460 are made of glass material and located between the fourth lens element 440 and the image plane 470, and will not affect a focal length of the wide-angle image capturing lens assembly.

The detailed optical data of the 4th embodiment are shown in Table 7 and the aspheric surface data are shown in Table 8 below.

TABLE 7

4th Embodiment
f = 0.91 mm, Fno = 2.45, HFOV = 85.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.065 | ASP | 0.300 | Plastic | 1.544 | 55.9 | -3.12 |

TABLE 7-continued

4th Embodiment
f = 0.91 mm, Fno = 2.45, HFOV = 85.0 deg.

| Surface # | | Curvature Radius | | Thickness | Material | Index | Abbe # | Focal Length |
|---|---|---|---|---|---|---|---|---|
| 2 | | 1.302 | ASP | 0.600 | | | | |
| 3 | Lens 2 | −3.016 | ASP | 0.850 | Plastic | 1.640 | 23.3 | 5.93 |
| 4 | | −1.865 | ASP | 0.151 | | | | |
| 5 | Ape. Stop | Plano | | 0.208 | | | | |
| 6 | Lens 3 | 1.116 | ASP | 0.720 | Plastic | 1.544 | 55.9 | 0.86 |
| 7 | | −0.629 | ASP | 0.172 | | | | |
| 8 | Lens 4 | −0.247 | ASP | 0.332 | Plastic | 1.634 | 23.8 | −78.72 |
| 9 | | −0.378 | ASP | 0.100 | | | | |
| 10 | IR-cut filter | Plano | | 0.300 | Glass | 1.517 | 64.2 | — |
| 11 | | Plano | | 0.100 | | | | |
| 12 | Cover glass | Plano | | 0.400 | Glass | 1.517 | 64.2 | — |
| 13 | | Plano | | 0.252 | | | | |
| 14 | Image | Plano | | — | | | | |

Note:
Reference wavelength is 587.6 nm (d-line).
Effective radius of Surface 9 is 0.640 mm.

TABLE 8

Aspheric Coefficients

| Surface # | 1 | 2 | 3 | 4 |
|---|---|---|---|---|
| k = | −5.2874E+01 | −1.4892E+01 | 1.3546E+01 | −3.2970E+00 |
| A4 = | −1.5719E−02 | 4.5972E−01 | −8.3335E−02 | −2.8762E−01 |
| A6 = | 1.4824E−02 | −4.8481E−01 | 3.2149E−01 | −3.1511E−01 |
| A8 = | −2.9277E−03 | 5.0117E−01 | −1.4600E+00 | 5.0933E+00 |
| A10 = | 2.7450E−04 | | 1.9720E+00 | −1.0134E+01 |

| Surface # | 6 | 7 | 8 | 9 |
|---|---|---|---|---|
| k = | −6.0601E+00 | −9.6679E−01 | −1.4229E+00 | −2.0273E+00 |
| A4 = | 1.6494E−01 | 8.1546E−01 | 8.5930E−01 | −9.1009E−01 |
| A6 = | −1.2949E+00 | −1.0932E+01 | −3.9450E+00 | 7.2761E+00 |
| A8 = | −5.6980E+00 | 3.2841E+01 | 2.1132E+01 | −1.1764E+01 |
| A10 = | | −3.2566E+01 | −2.4678E+01 | 8.3843E+00 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

4th Embodiment

| f (mm) | 0.91 | R5/R6 | −1.77 |
|---|---|---|---|
| Fno | 2.45 | |(R6 + R7)/(R6 − R7)| | 2.30 |
| HFOV (deg.) | 85.0 | |R8/f| | 0.42 |
| V2 | 23.3 | |f2/f3| | 6.90 |
| T12/CT2 | 0.71 | f/f4 | −0.01 |
| T23/T12 | 0.60 | SD/TD | 0.43 |
| CT3/CT4 | 2.17 | FOV (deg.) | 170.0 |

5th Embodiment

Figure 9:
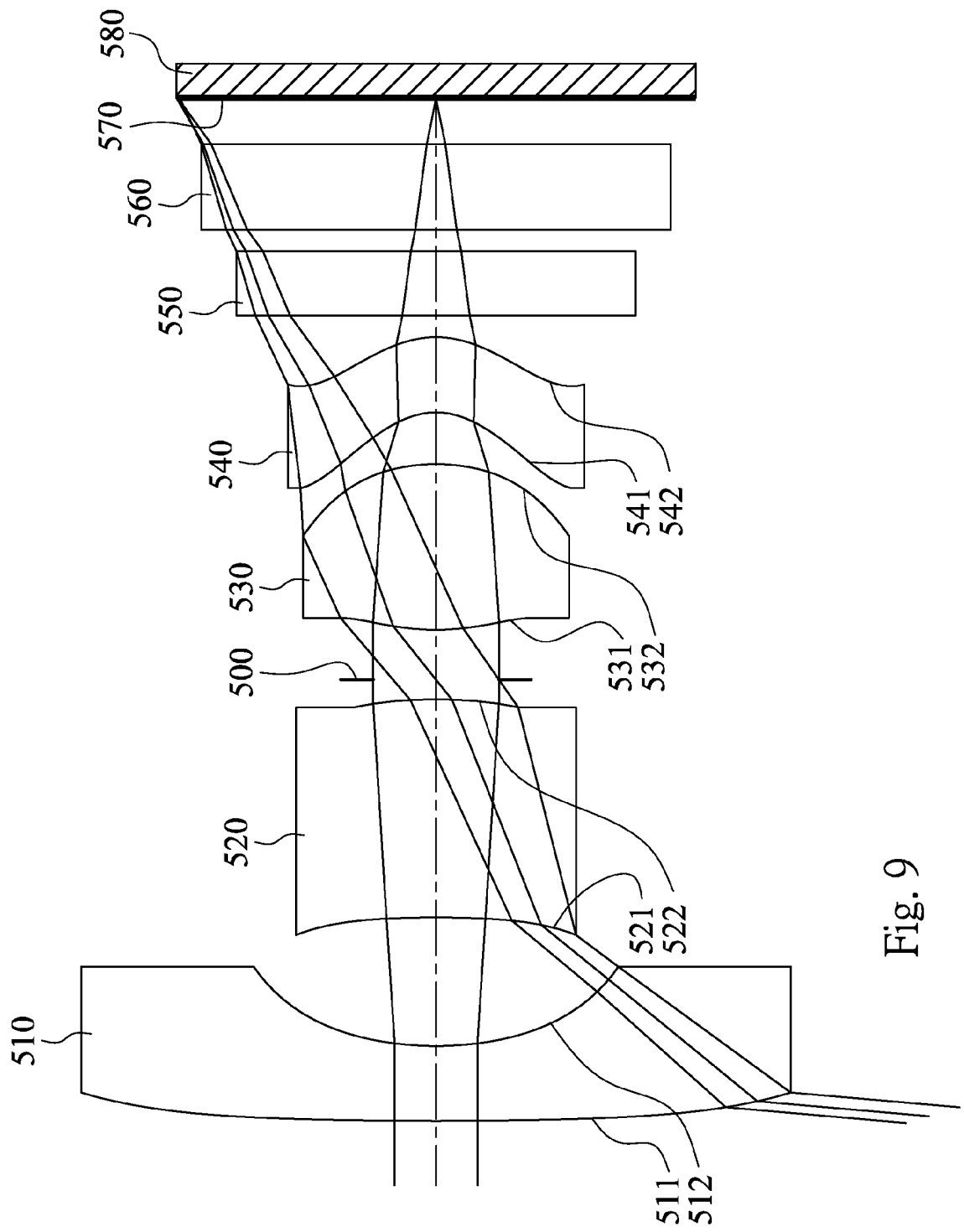
FIG. 9 is a schematic view of an image capturing device according to the 5th embodiment of the present disclosure.
Figure 10:
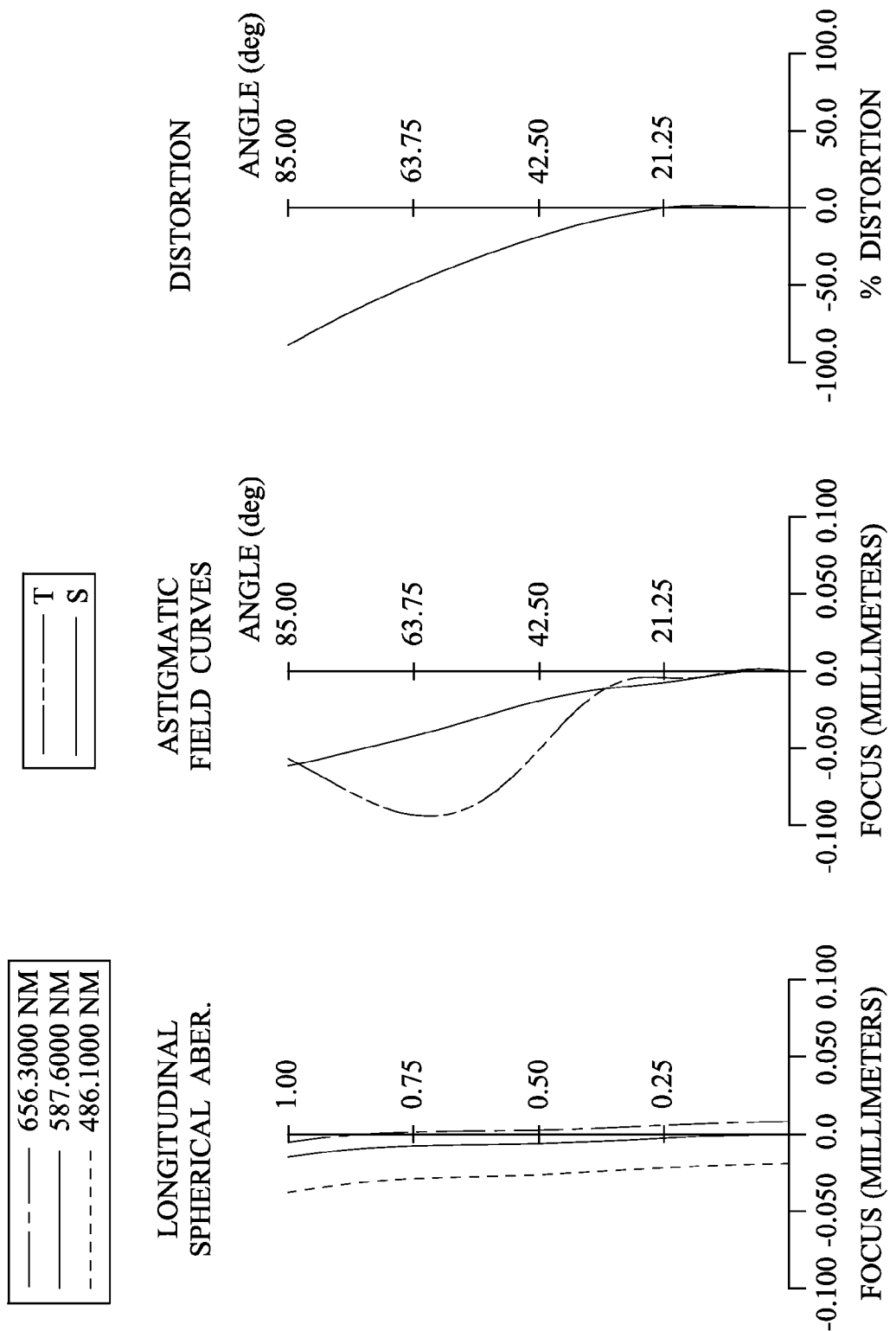
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes a wide-angle image capturing lens assembly (its reference numeral is omitted) and an image sensor 580. The wide-angle image capturing lens assembly includes, in order from an object side to an image side, a first lens element 510, a second lens element 520, an aperture stop 500, a third lens element 530, a fourth lens element 540, an IR-cut filter 550, a cover glass 560 and an image plane 570. The image sensor 580 is located on or near the image plane 570 of the wide-angle image capturing lens assembly. The wide-angle image capturing lens assembly has a total of four lens elements (510-540) with refractive power. There is an air gap in a paraxial region between any two of the first lens element 510, the second lens element 520, the third lens element 530 and the fourth lens element 540 that are adjacent to each other.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. Furthermore, both of the object-side surface 541 and the image-side surface 542 of the fourth lens element 540 have at least one inflection point in an off-axis region thereof.

The IR-cut filter 550 and the cover glass 560 are made of glass material and located between the fourth lens element 540 and the image plane 570, and will not affect a focal length of the wide-angle image capturing lens assembly.

The detailed optical data of the 5th embodiment are shown in Table 9 and the aspheric surface data are shown in Table 10 below.

TABLE 9

5th Embodiment f = 0.95 mm, Fno = 2.45, HFOV = 85.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 24.687 | ASP | 0.349 | Plastic | 1.544 | 55.9 | −2.94 |
| 2 | | 1.493 | ASP | 0.600 | | | | |
| 3 | Lens 2 | −4.199 | ASP | 1.015 | Plastic | 1.640 | 23.3 | 7.95 |
| 4 | | −2.517 | ASP | 0.092 | | | | |
| 5 | Ape. Stop | Plano | | 0.232 | | | | |
| 6 | Lens 3 | 1.077 | ASP | 0.773 | Plastic | 1.544 | 55.9 | 1.00 |
| 7 | | −0.823 | ASP | 0.241 | | | | |
| 8 | Lens 4 | −0.326 | ASP | 0.350 | Plastic | 1.634 | 23.8 | 42.24 |
| 9 | | −0.456 | ASP | 0.100 | | | | |
| 10 | IR-cut filter | Plano | | 0.300 | Glass | 1.517 | 64.2 | — |
| 11 | | Plano | | 0.100 | | | | |
| 12 | Cover glass | Plano | | 0.400 | Glass | 1.517 | 64.2 | — |
| 13 | | Plano | | 0.215 | | | | |
| 14 | Image | Plano | | — | | | | |

Note:

Reference wavelength is 587.6 nm (d-line).

Effective radius of Surface 9 is 0.690 mm.

TABLE 10

Aspheric Coefficients

| Surface # | 1 | 2 | 3 | 4 |
|---|---|---|---|---|
| k = | −9.9000E+01 | −1.9265E+01 | 3.2713E+01 | 2.9541E+01 |
| A4 = | 5.7105E−04 | 5.4702E−01 | 3.4662E−02 | −2.8897E−01 |
| A6 = | 6.5680E−03 | −3.7029E−01 | −1.1182E−02 | 3.1766E+00 |
| A8 = | −1.3238E−03 | 3.4078E−01 | −1.9903E+00 | −2.3747E+01 |
| A10 = | 1.1964E−04 | | 3.4012E+00 | 1.1271E+02 |

| Surface # | 6 | 7 | 8 | 9 |
|---|---|---|---|---|
| k = | −1.5743E+00 | −7.9593E−01 | −1.3473E+00 | −2.6561E+00 |
| A4 = | −5.0399E−01 | 8.2484E−02 | 1.0184E+00 | −8.3390E−01 |
| A6 = | −1.2385E+00 | −5.1236E+00 | −4.3955E+00 | 4.9825E+00 |
| A8 = | −2.6327E+00 | 1.1908E+01 | 1.5881E+01 | −6.1967E+00 |
| A10 = | | −9.2272E+00 | −1.5103E+01 | 3.1612E+00 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f (mm) | 0.95 | R5/R6 | −1.31 |
| Fno | 2.45 | |(R6 + R7)/(R6 − R7)| | 2.31 |
| HFOV (deg.) | 85.0 | |R8/f| | 0.48 |
| V2 | 23.3 | |f2/f3| | 7.95 |
| T12/CT2 | 0.59 | f/f4 | 0.02 |
| T23/T12 | 0.54 | SD/TD | 0.44 |
| CT3/CT4 | 2.21 | FOV (deg.) | 170.0 |

6th Embodiment

Figure 11:
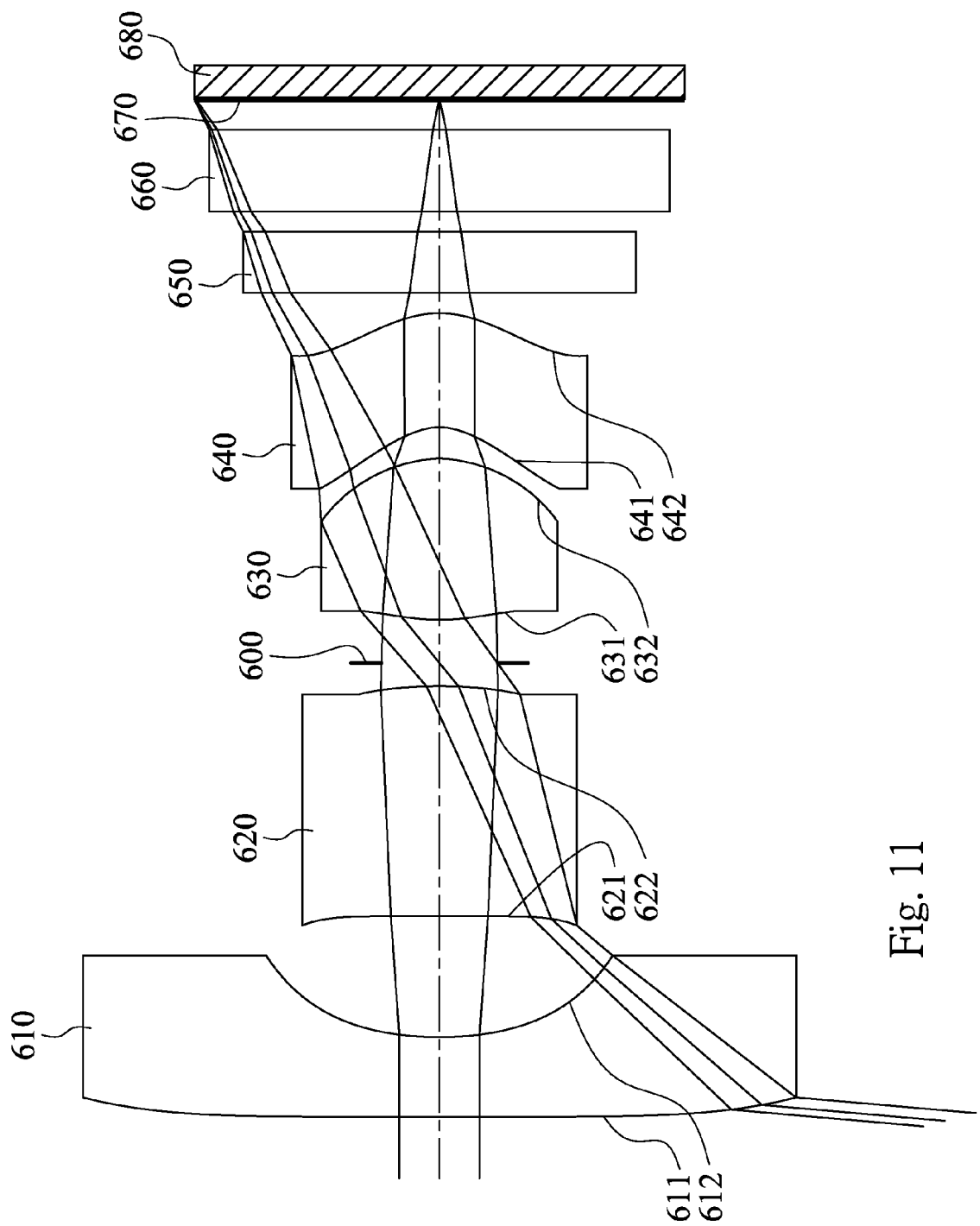
FIG. 11 is a schematic view of an image capturing device according to the 6th embodiment of the present disclosure.
Figure 12:
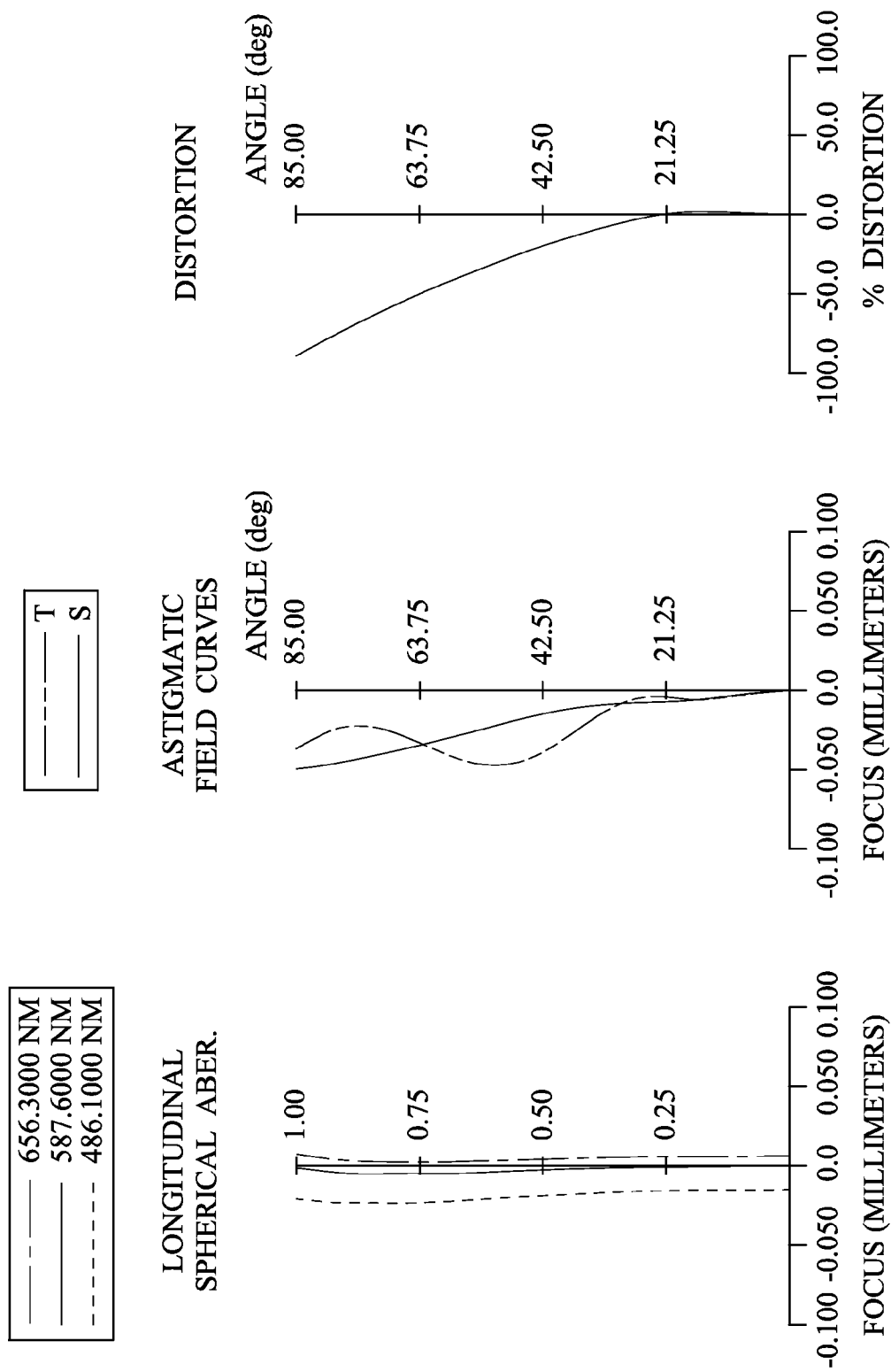
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes a wide-angle image capturing lens assembly (its reference numeral is omitted) and an image sensor 680. The wide-angle image capturing lens assembly includes, in order from an object side to an image side, a first lens element 610, a second lens element 620, an aperture stop 600, a third lens element 630, a fourth lens element 640, an IR-cut filter 650, a cover glass 660 and an image plane 670. The image sensor 680 is located on or near the image plane 670 of the wide-angle image capturing lens assembly. The wide-angle image capturing lens assembly has a total of four lens elements (610-640) with refractive power. There is an air gap in a paraxial region between any two of the first lens element 610, the second lens element 620, the third lens element 630 and the fourth lens element 640 that are adjacent to each other.

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. Furthermore, the object-side surface 641 and the image-side surface 642 of the fourth lens element 640 have at least one inflection point in an off-axis region thereof.

The IR-cut filter 650 and the cover glass 660 are made of glass material and located between the fourth lens element 640 and the image plane 670, and will not affect a focal length of the wide-angle image capturing lens assembly.

The detailed optical data of the 6th embodiment are shown in Table 11 and the aspheric surface data are shown in Table 12 below.

TABLE 11

6th Embodiment
f = 0.97 mm, Fno = 2.45, HFOV = 85.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 97.249 | ASP | 0.392 | Plastic | 1.544 | 55.9 | −2.85 |
| 2 | | 1.524 | ASP | 0.595 | | | | |
| 3 | Lens 2 | −100.000 | ASP | 1.129 | Plastic | 1.640 | 23.3 | 4.44 |
| 4 | | −2.774 | ASP | 0.114 | | | | |
| 5 | Ape. Stop | Plano | | 0.213 | | | | |
| 6 | Lens 3 | 1.125 | ASP | 0.791 | Plastic | 1.544 | 55.9 | 0.81 |
| 7 | | −0.546 | ASP | 0.154 | | | | |
| 8 | Lens 4 | −0.292 | ASP | 0.560 | Plastic | 1.640 | 23.3 | 52.31 |
| 9 | | −0.506 | ASP | 0.100 | | | | |
| 10 | IR-cut filter | Plano | | 0.300 | Glass | 1.517 | 64.2 | — |
| 11 | | Plano | | 0.100 | | | | |
| 12 | Cover glass | Plano | | 0.400 | Glass | 1.517 | 64.2 | — |
| 13 | | Plano | | 0.150 | | | | |
| 14 | Image | Plano | | — | | | | |

Note:
Reference wavelength is 587.6 nm (d-line).
Effective radius of Surface 9 is 0.726 mm.

TABLE 12

| Aspheric Coefficients | | | | |
|---|---|---|---|---|
| Surface # | 1 | 2 | 3 | 4 |
| k = | −1.0000E+00 | −1.4153E+01 | −5.0000E+01 | −5.0000E+01 |
| A4 = | −3.9879E−03 | 4.7839E−01 | −7.1818E−05 | −8.4616E−01 |
| A6 = | 7.3432E−03 | −3.0550E−02 | −4.3690E−02 | 6.9266E−01 |
| A8 = | −1.3446E−03 | 6.2813E−02 | −1.8551E+00 | 1.8053E+00 |
| A10 = | 9.5480E−05 | | 2.0400E+00 | |
| Surface # | 6 | 7 | 8 | 9 |
| k = | 3.6657E+00 | −2.4144E+00 | −2.2175E+00 | −1.1845E+00 |
| A4 = | −1.1906E+00 | 6.0631E−01 | 5.5576E−01 | 1.3304E+00 |
| A6 = | −1.4544E+00 | −6.4899E+00 | 2.1836E+00 | −1.1749E+00 |
| A8 = | −1.0586E+01 | 9.2697E+00 | −3.4706E+01 | 1.2334E+00 |
| A10 = | | −3.2629E+00 | 1.3391E+02 | −5.3763E−01 |
| A12 = | | | −1.9897E+02 | |
| A14 = | | | 1.0206E+02 | |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f (mm) | 0.97 | R5/R6 | −2.06 |
| Fno | 2.45 | |(R6 + R7)/(R6 − R7)| | 3.31 |
| HFOV (deg.) | 85.0 | |R8/f| | 0.52 |
| V2 | 23.3 | |f2/f3| | 5.48 |
| T12/CT2 | 0.53 | f/f4 | 0.02 |
| T23/T12 | 0.55 | SD/TD | 0.44 |
| CT3/CT4 | 1.41 | FOV (deg.) | 170.0 |

7th Embodiment

Figure 13:
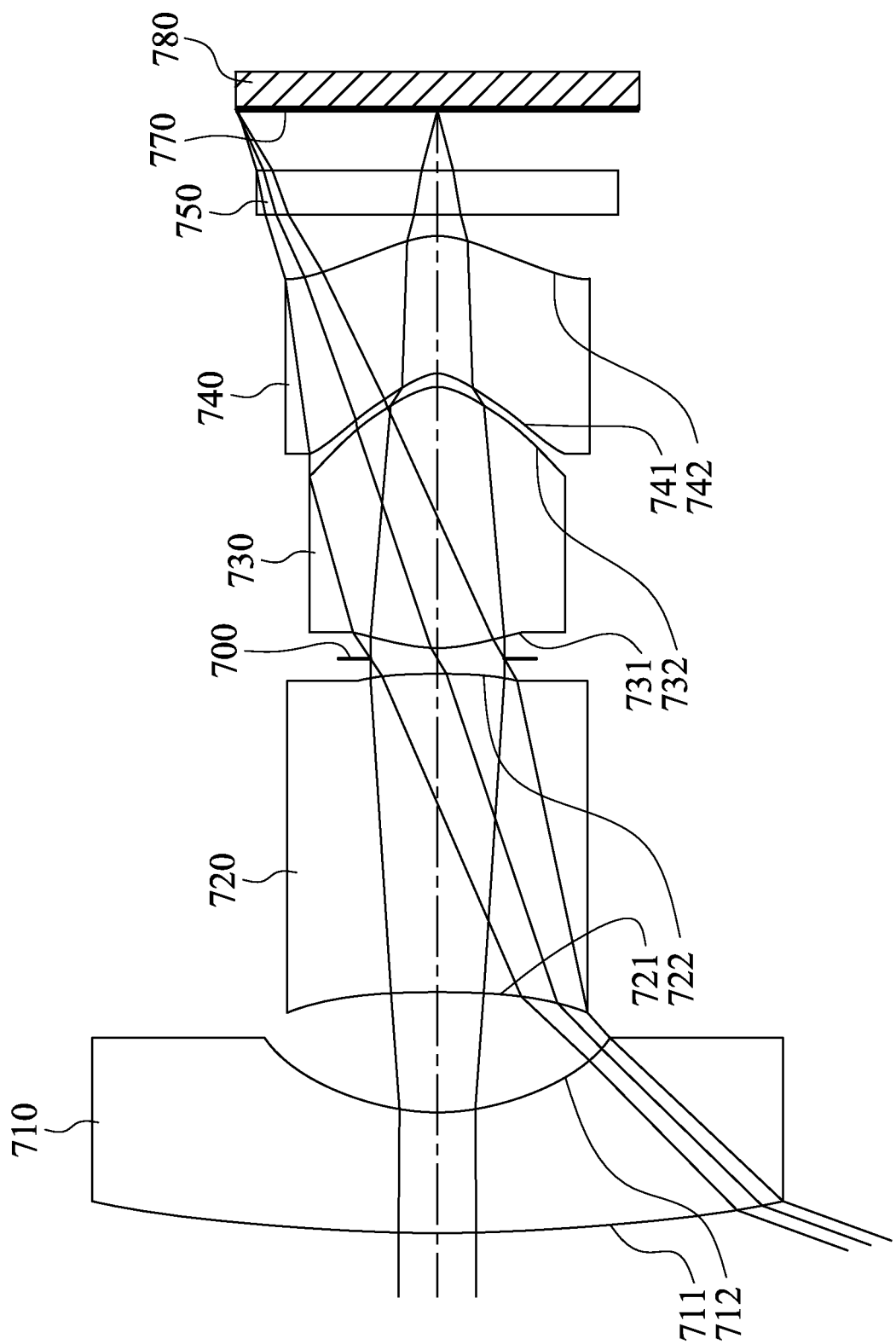
FIG. 13 is a schematic view of an image capturing device according to the 7th embodiment of the present disclosure.
Figure 14:
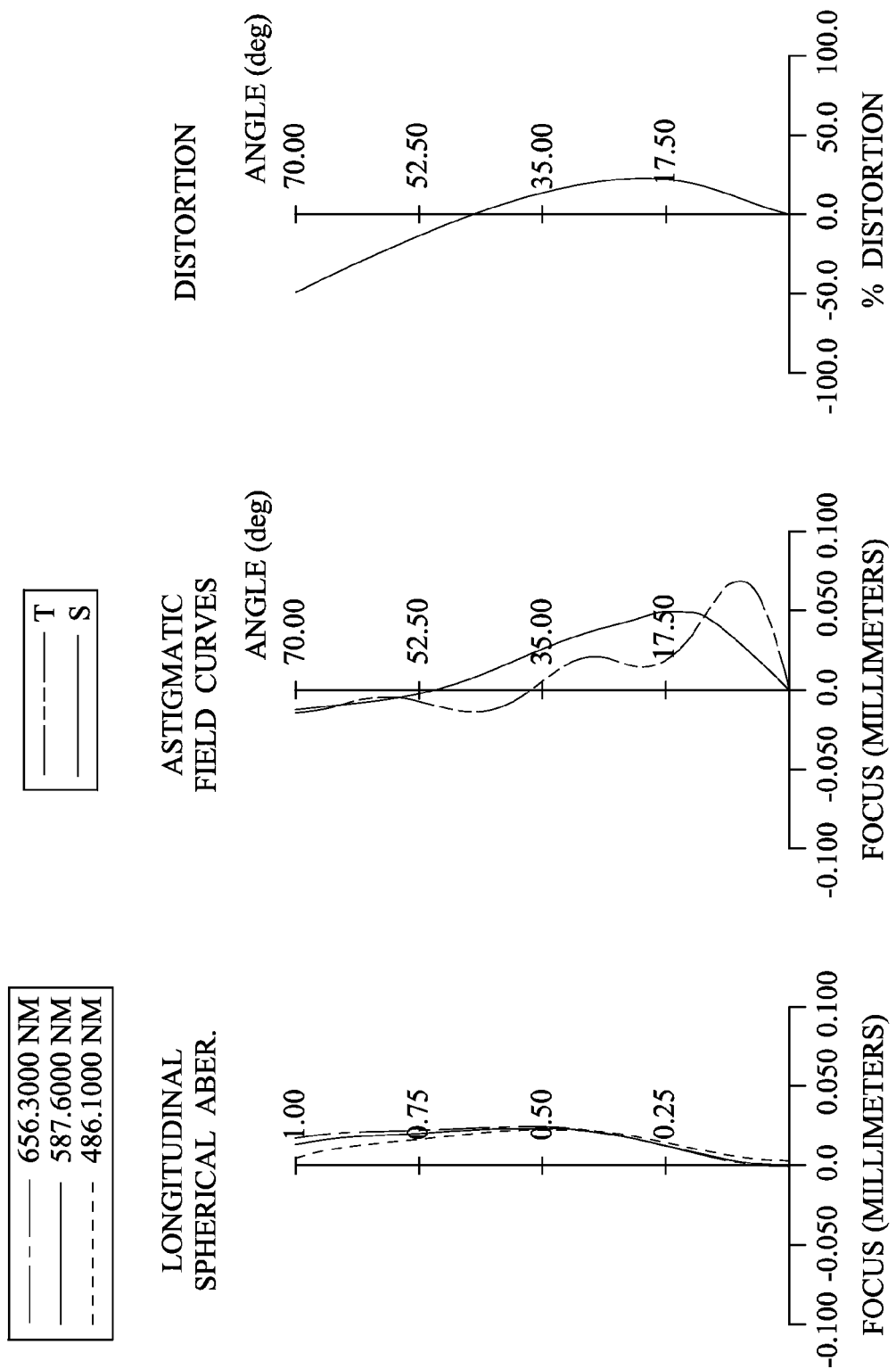
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes a wide-angle image capturing lens assembly (its reference numeral is omitted) and an image sensor 780. The wide-angle image capturing lens assembly includes, in order from an object side to an image side, a first lens element 710, a second lens element 720, an aperture stop 700, a third lens element 730, a fourth lens element 740, an IR-cut filter 750 and an image plane 770. The image sensor 780 is located on or near the image plane 770 of the wide-angle image capturing lens assembly. The wide-angle image capturing lens assembly has a total of four lens elements (710-740) with refractive power. There is an air gap in a paraxial region between any two of the first lens element 710, the second lens element 720, the third lens element 730 and the fourth lens element 740 that are adjacent to each other.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. Furthermore, both of the object-side surface 741 and the image-side surface 742 of the fourth lens element 740 have at least one inflection point in an off-axis region thereof.

The IR-cut filter 750 is made of glass material and located between the fourth lens element 740 and the image plane 770, and will not affect a focal length of the wide-angle image capturing lens assembly.

The detailed optical data of the 7th embodiment are shown in Table 13 and the aspheric surface data are shown in Table 14 below.

TABLE 13

7th Embodiment
f = 0.68 mm, Fno = 1.85, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.268 | ASP | 0.569 | Plastic | 1.514 | 56.8 | −2.41 |

TABLE 13-continued

7th Embodiment
f = 0.68 mm, Fno = 1.85, HFOV = 70.0 deg.

| Surface # | | Curvature Radius | | Thickness | Material | Index | Abbe # | Focal Length |
|---|---|---|---|---|---|---|---|---|
| 2 | | 1.030 | ASP | 0.567 | | | | |
| 3 | Lens 2 | −5.218 | ASP | 1.500 | Plastic | 1.583 | 30.2 | −31.10 |
| 4 | | −8.101 | ASP | 0.072 | | | | |
| 5 | Ape. Stop | | Plano | 0.050 | | | | |
| 6 | Lens 3 | 0.715 | ASP | 1.231 | Plastic | 1.514 | 56.8 | 0.51 |
| 7 | | −0.172 | ASP | 0.063 | | | | |
| 8 | Lens 4 | −0.135 | ASP | 0.648 | Plastic | 1.633 | 23.4 | 5.76 |
| 9 | | −0.372 | ASP | 0.100 | | | | |
| 10 | IR-cut filter | | Plano | 0.210 | Glass | 1.517 | 64.2 | — |
| 11 | | | Plano | 0.288 | | | | |
| 12 | Image | | Plano | — | | | | |

Note:
Reference wavelength is 587.6 nm (d-line).

TABLE 14

Aspheric Coefficients

| Surface # | 1 | 2 | 3 | 4 |
|---|---|---|---|---|
| k = | 1.1770E+01 | −6.6971E−01 | 4.1732E+01 | −1.0000E+00 |
| A4 = | −2.5080E−02 | −4.2040E−01 | −2.5352E−01 | −2.0147E−01 |
| A6 = | 8.1622E−03 | 1.4348E+00 | 5.2753E−01 | 8.0488E+00 |
| A8 = | −9.4623E−04 | −2.4157E+00 | −8.7169E−01 | −1.7792E+01 |
| A10 = | −5.1900E−05 | 1.9086E+00 | 6.4876E−01 | 8.3221E+00 |

| Surface # | 6 | 7 | 8 | 9 |
|---|---|---|---|---|
| k = | −1.0000E+00 | −3.4793E+00 | −3.1012E+00 | −5.0761E+00 |
| A4 = | −2.1660E+00 | −9.6272E−01 | −3.9753E−01 | 4.4263E−01 |
| A6 = | 8.8093E+00 | −2.3573E−01 | −1.1505E+00 | −1.1526E+00 |
| A8 = | −4.5394E+01 | −1.6012E+00 | −4.4237E+00 | 2.2154E+00 |
| A10 = | 1.0722E+02 | 1.0006E+01 | 4.7375E+01 | −2.0769E+00 |
| A12 = | | | −5.9927E+01 | 1.7945E+00 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions

| 7th Embodiment | | | |
|---|---|---|---|
| f (mm) | 0.68 | R5/R6 | −4.16 |
| Fno | 1.85 | \|(R6 + R7)/(R6 − R7)\| | 8.20 |
| HFOV (deg.) | 70.0 | \|R8/f\| | 0.55 |
| V2 | 30.2 | \|f2/f3\| | 60.98 |
| T12/CT2 | 0.38 | f/f4 | 0.12 |
| T23/T12 | 0.22 | SD/TD | 0.42 |
| CT3/CT4 | 1.90 | FOV (deg.) | 140.0 |

8th Embodiment

Figure 15:
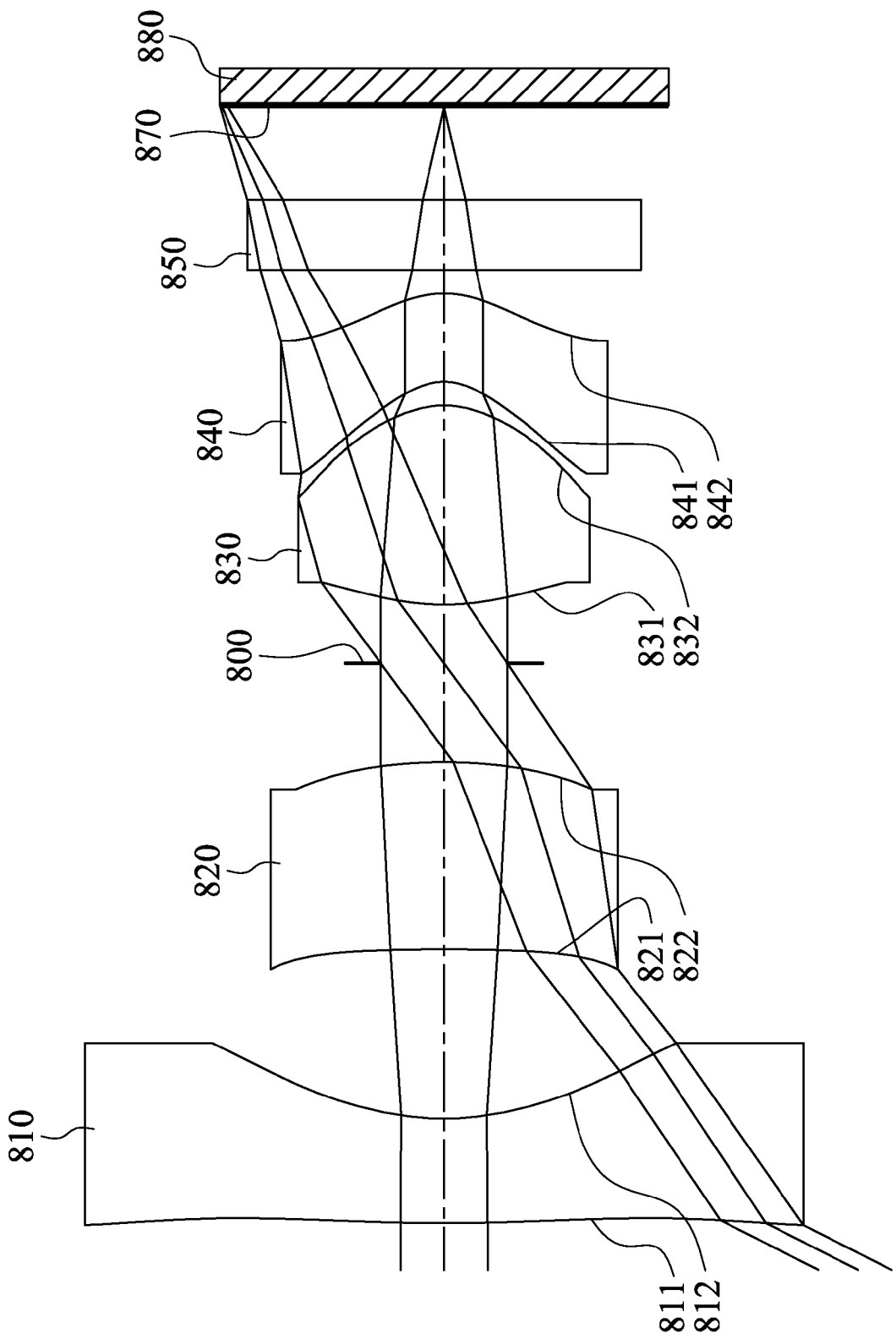
FIG. 15 is a schematic view of an image capturing device according to the 8th embodiment of the present disclosure.
Figure 16:
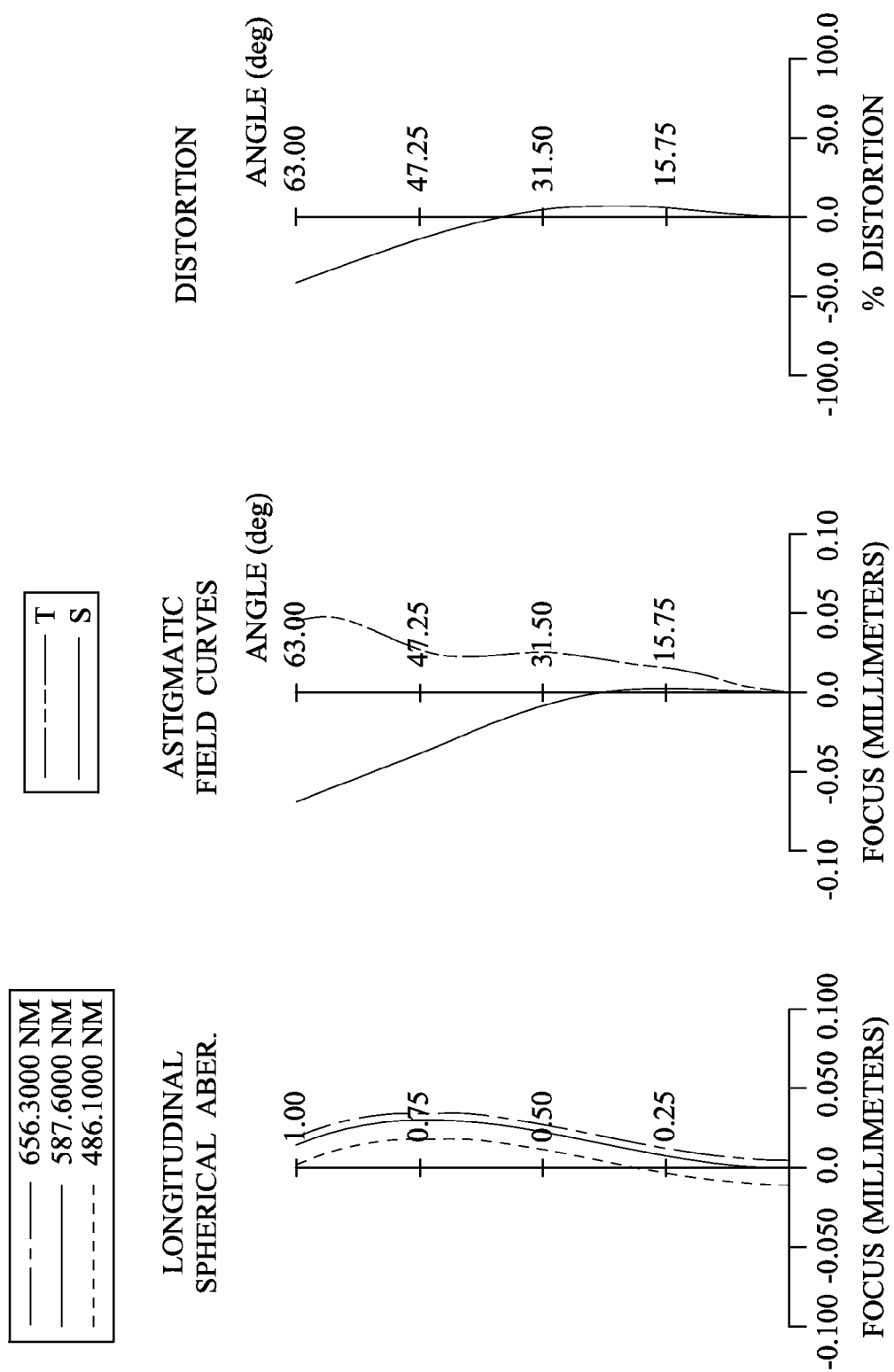
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes a wide-angle image capturing lens assembly (its reference numeral is omitted) and an image sensor 880. The wide-angle image capturing lens assembly includes, in order from an object side to an image side, a first lens element 810, a second lens element 820, an aperture stop 800, a third lens element 830, a fourth lens element 840, an IR-cut filter 850 and an image plane 870. The image sensor 880 is located on or near the image plane 870 of the wide-angle image capturing lens assembly. The wide-angle image capturing lens assembly has a total of four lens elements (810-840) with refractive power. There is an air gap in a paraxial region between any two of the first lens element 810, the second lens element 820, the third lens element 830 and the fourth lens element 840 that are adjacent to each other.

The first lens element 810 with negative refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. Furthermore, both of the object-side surface 841 and the image-side surface 842 of the fourth lens element 840 have at least one inflection point in an off-axis region thereof.

The IR-cut filter 850 is made of glass material and located between the fourth lens element 840 and the image plane 870, and will not affect a focal length of the wide-angle image capturing lens assembly.

The detailed optical data of the 8th embodiment are shown in Table 15 and the aspheric surface data are shown in Table 16 below.

TABLE 15

8th Embodiment
f = 0.82 mm, Fno = 2.20, HFOV = 63.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.242 | ASP | 0.446 | Plastic | 1.514 | 56.8 | −2.81 |
| 2 | | 1.206 | ASP | 0.722 | | | | |
| 3 | Lens 2 | −9.537 | ASP | 0.800 | Plastic | 1.607 | 26.6 | 4.00 |
| 4 | | −1.996 | ASP | 0.421 | | | | |
| 5 | Ape. Stop | Plano | | 0.251 | | | | |
| 6 | Lens 3 | 1.076 | ASP | 0.850 | Plastic | 1.544 | 55.9 | 0.68 |
| 7 | | −0.406 | ASP | 0.102 | | | | |
| 8 | Lens 4 | −0.242 | ASP | 0.376 | Plastic | 1.634 | 23.8 | −4.61 |
| 9 | | −0.423 | ASP | 0.100 | | | | |
| 10 | IR-cut filter | Plano | | 0.300 | Glass | 1.517 | 64.2 | — |
| 11 | | Plano | | 0.403 | | | | |
| 12 | Image | Plano | | — | | | | |

Note:
Reference wavelength is 587.6 nm (d-line).

TABLE 16

Aspheric Coefficients

| Surface # | 1 | 2 | 3 | 4 |
|---|---|---|---|---|
| k = | −9.3476E+01 | 2.5969E−01 | −1.0000E+01 | −4.5191E+01 |
| A4 = | −3.1783E−02 | −2.9670E−01 | −1.3539E−01 | −4.6155E−01 |
| A6 = | 1.6348E−03 | 2.9377E−01 | 5.4895E−01 | 4.0042E−01 |
| A8 = | 2.2161E−03 | −2.5191E−01 | −2.0981E+00 | −6.1339E−01 |
| A10 = | −2.1088E−04 | −2.3072E−02 | 1.6794E+00 | 7.5263E−01 |

| Surface # | 6 | 7 | 8 | 9 |
|---|---|---|---|---|
| k = | −1.0000E+00 | −8.6072E−01 | −1.5390E+00 | −1.9050E+00 |
| A4 = | −4.6350E−01 | 2.5038E+00 | 3.0060E+00 | 1.1033E+00 |
| A6 = | 2.0427E+00 | −9.6654E+00 | −1.2128E+01 | 2.8138E+00 |
| A8 = | −1.3798E+01 | 1.7278E+01 | 2.8832E+00 | −1.9156E+01 |
| A10 = | 2.5581E+01 | −8.5696E+00 | 7.4956E+01 | 3.7033E+01 |
| A12 = | | | −1.0491E+02 | −2.4159E+01 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions

| 8th Embodiment | | | |
|---|---|---|---|
| f (mm) | 0.82 | R5/R6 | −2.65 |
| Fno | 2.20 | \|(R6 + R7)/(R6 − R7)\| | 3.96 |
| HFOV (deg.) | 63.0 | \|R8/f\| | 0.52 |
| V2 | 26.6 | \|f2/f3\| | 5.88 |
| T12/CT2 | 0.90 | f/f4 | −0.18 |
| T23/T12 | 0.93 | SD/TD | 0.40 |
| CT3/CT4 | 2.26 | FOV (deg.) | 126.0 |

9th Embodiment

Figure 17:
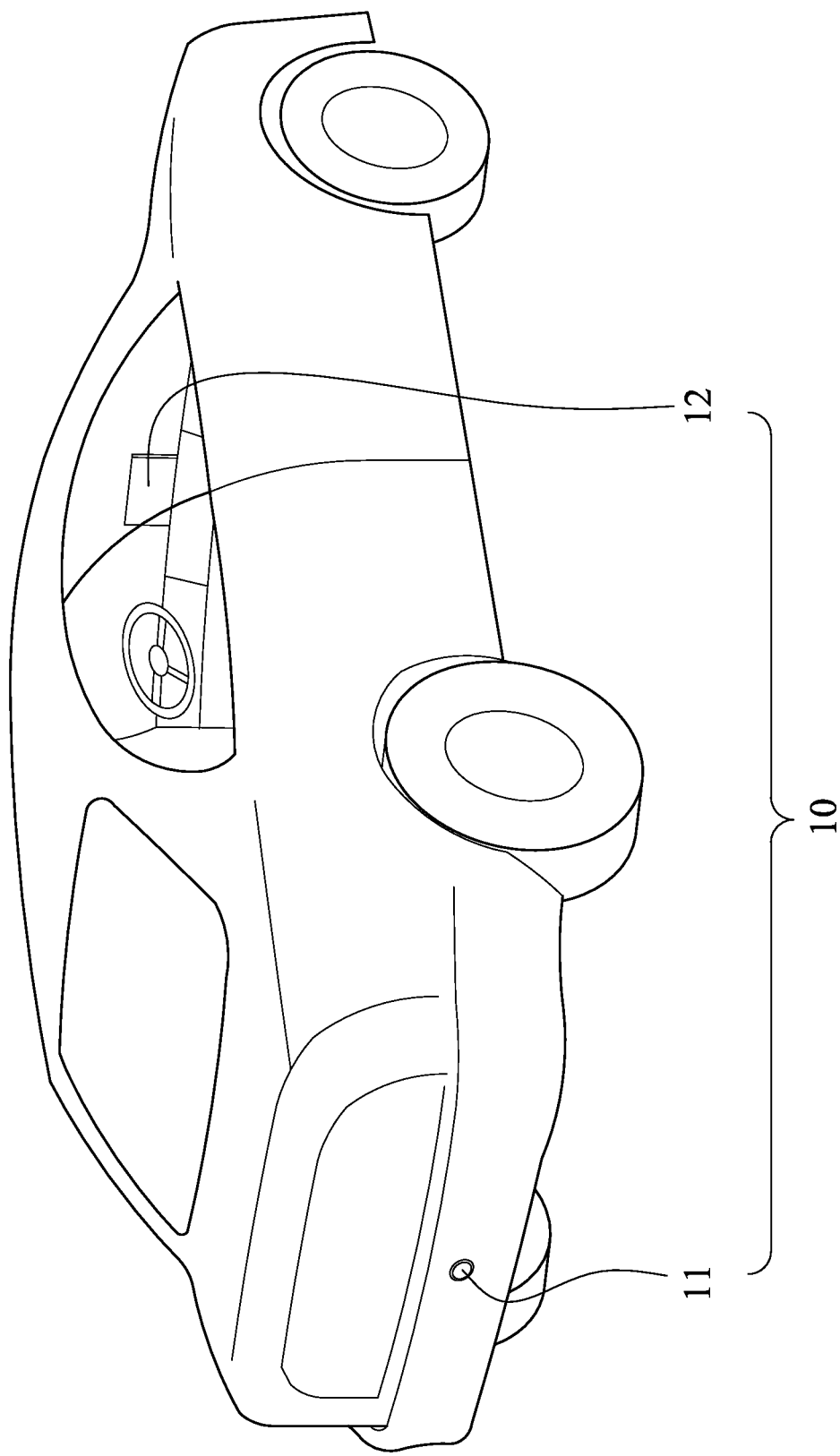
FIG. 17 is a schematic view of a vehicle device according to the 9th embodiment of the present disclosure.

FIG. 17 is a schematic view of a vehicle device 10 according to the 9th embodiment of the present disclosure. The vehicle device 10 of the 9th embodiment is a rear view camera system. The vehicle device 10 includes an image capturing device 11 and a monitor 12, and the image capturing device 11 is connected with the monitor 12. The image capturing device 11 includes a wide-angle image capturing lens assembly (not shown) according to the present disclosure and an image sensor (not shown), and the image sensor is disposed on or near an image plane of the wide-angle image capturing lens assembly.

10th Embodiment

Figure 18:
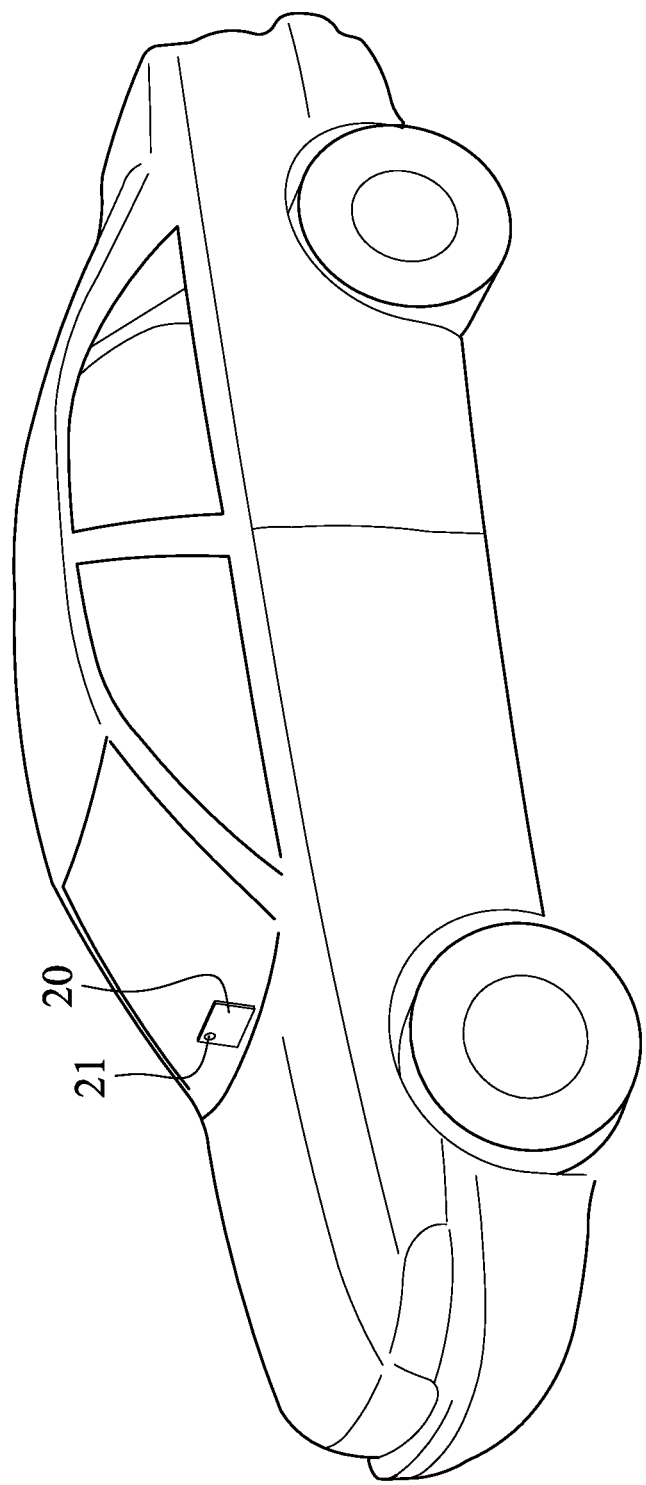
FIG. 18 is a schematic view of a vehicle device according to the 10th embodiment of the present disclosure.

FIG. 18 is a schematic view of a vehicle device 20 according to the 10th embodiment of the present disclosure. The vehicle device 20 of the 10th embodiment is a driving recording system. The vehicle device 20 includes an image capturing device 21. The image capturing device 21 includes a wide-angle image capturing lens assembly (not shown) according to the present disclosure and an image sensor (not shown), and the image sensor is disposed on or near an image plane of the wide-angle image capturing lens assembly.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A wide-angle image capturing lens assembly comprising, in order from an object side to an image side:
   a first lens element with negative refractive power having an image-side surface being concave in a paraxial region thereof;
   a second lens element with refractive power having an image-side surface being convex in a paraxial region thereof;
   a third lens element having positive refractive power; and
   a fourth lens element with refractive power having an object-side surface being concave in a paraxial region thereof and an image-side surface being convex in a paraxial region thereof, wherein both of the object-side surface and the image-side surface of the fourth lens element are aspheric, and at least one of the object-side surface and the image-side surface of the fourth lens element has at least one inflection point in an off-axis region thereof;
   wherein the wide-angle image capturing lens assembly has a total of four lens elements with refractive power, a focal length of the wide-angle image capturing lens assembly is f, a focal length of the second lens element is f2, a focal length of the third lens element is f3, a focal length of the fourth lens element is f4, a curvature radius of an image-side surface of the third lens element is R6, a curvature radius of the object-side surface of the fourth lens element is R7, and the following relationships are satisfied:

$$1.5 < |f2/f3|;$$

$$-0.25 < f/f4; \text{ and}$$

$$|(R6+R7)/(R6-R7)| < 25.$$

2. The wide-angle image capturing lens assembly of claim 1, wherein the fourth lens element has positive refractive power.

3. The wide-angle image capturing lens assembly of claim 2, wherein a maximal field of view of the wide-angle image capturing lens assembly is FOV, and the following relationship is satisfied:

$$120 \text{ degrees} \leq FOV < 200 \text{ degrees}.$$

4. The wide-angle image capturing lens assembly of claim 1, wherein the second lens element has an object-side surface being concave in a paraxial region thereof.

5. The wide-angle image capturing lens assembly of claim 1, wherein an axial distance between the first lens element and the second lens element is T12, a central thickness of the second lens element is CT2, and the following relationship is satisfied:

$$T12/CT2 < 1.20.$$

6. The wide-angle image capturing lens assembly of claim 1, wherein an Abbe number of the second lens element is V2, and the following relationship is satisfied:

$$V2 < 32.$$

7. The wide-angle image capturing lens assembly of claim 1, wherein a curvature radius of an object-side surface of the third lens element is R5, the curvature radius of the image-side surface of the third lens element is R6, and the following relationship is satisfied:

$$-2.3 < R5/R6 < -1.0.$$

8. The wide-angle image capturing lens assembly of claim 1, wherein the focal length of the second lens element is f2, the focal length of the third lens element is f3, and the following relationship is satisfied:

$$3.0<|f2/f3|.$$

9. The wide-angle image capturing lens assembly of claim 1, wherein the focal length of the wide-angle image capturing lens assembly is f, a curvature radius of the image-side surface of the fourth lens element is R8, and the following relationship is satisfied:

$$|R8/f|<0.90.$$

10. The wide-angle image capturing lens assembly of claim 1, wherein a central thickness of the third lens element is CT3, a central thickness of the fourth lens element is CT4, and the following relationship is satisfied:

$$0.75<CT3/CT4<2.50.$$

11. The wide-angle image capturing lens assembly of claim 1, further comprising:
   a stop located between the second lens element and the third lens element;
   wherein an axial distance between the stop and the image-side surface of the fourth lens element is SD, an axial distance between an object-side surface of the first lens element and the image-side surface of the fourth lens element is TD, and the following relationship is satisfied:

$$0.30<SD/TD<0.55.$$

12. An image capturing device, comprising:
   the wide-angle image capturing lens assembly of claim 1; and
   an image sensor located on the image side of the wide-angle image capturing lens assembly.

13. A vehicle device, comprising:
   the image capturing device of claim 12.

14. A wide-angle image capturing lens assembly comprising, in order from an object side to an image side:
   a first lens element with negative refractive power having an image-side surface being concave in a paraxial region thereof;
   a second lens element with positive refractive power having an image-side surface being convex in a paraxial region thereof;
   a third lens element having positive refractive power; and
   a fourth lens element with refractive power having an object-side surface being concave in a paraxial region thereof and an image-side surface being convex in a paraxial region thereof, wherein both of the object-side surface and the image-side surface of the fourth lens element are aspheric, and at least one of the object-side surface and the image-side surface of the fourth lens element has at least one inflection point in an off-axis region thereof;
   wherein the wide-angle image capturing lens assembly has a total of four lens elements with refractive power, there is an air gap in a paraxial region between any two of the first lens element, the second lens element, the third lens element and the fourth lens element that are adjacent to each other, a focal length of the wide-angle image capturing lens assembly is f, a focal length of the second lens element is f2, a focal length of the third lens element is f3, a focal length of the fourth lens element is f4, an axial distance between the first lens element and the second lens element is T12, a central thickness of the second lens element is CT2, an Abbe number of the second lens element is V2, and the following relationships are satisfied:

$$1.5<|f2/f3|;$$

$$-0.45<f/f4;$$

$$T12/CT2<1.20;\text{ and}$$

$$V2<32.$$

15. The wide-angle image capturing lens assembly of claim 14, wherein the second lens element has an object-side surface being concave in a paraxial region thereof.

16. The wide-angle image capturing lens assembly of claim 14, wherein the focal length of the second lens element is f2, the focal length of the third lens element is f3, and the following relationship is satisfied:

$$3.0<|f2/f3|.$$

17. The wide-angle image capturing lens assembly of claim 14, wherein a central thickness of the third lens element is CT3, a central thickness of the fourth lens element is CT4, and the following relationship is satisfied:

$$0.75<CT3/CT4<2.50.$$

18. The wide-angle image capturing lens assembly of claim 14, wherein the axial distance between the first lens element and the second lens element is T12, an axial distance between the second lens element and the third lens element is T23, and the following relationship is satisfied:

$$0.20<T23/T12<1.50.$$

19. The wide-angle image capturing lens assembly of claim 14, wherein third lens element has an object-side surface being convex in a paraxial region thereof and an image-side surface being convex in a paraxial region thereof, a curvature radius of the object-side surface of the third lens element is R5, a curvature radius of the image-side surface of the third lens element is R6, and the following relationship is satisfied:

$$-2.3<R5/R6<-1.0.$$

20. The wide-angle image capturing lens assembly of claim 14, wherein the focal length of the wide-angle image capturing lens assembly is f, a curvature radius of the image-side surface of the fourth lens element is R8, and the following relationship is satisfied:

$$|R8/f|<0.90.$$

* * * * *